(12) United States Patent
Whitehead et al.

(10) Patent No.: US 8,140,223 B2
(45) Date of Patent: Mar. 20, 2012

(54) MULTIPLE-ANTENNA GNSS CONTROL SYSTEM AND METHOD

(75) Inventors: Michael L. Whitehead, Scottsdale, AZ (US); Walter J. Feller, Airdrie (CA); John A. McClure, Scottsdale, AZ (US); Steven R. Miller, Scottsdale, AZ (US)

(73) Assignee: Hemisphere GPS LLC, Calgary, Alberta (CA)

( * ) Notice: Subject to any disclaimer, the term of this patent is extended or adjusted under 35 U.S.C. 154(b) by 547 days.

(21) Appl. No.: 12/355,776

(22) Filed: Jan. 17, 2009

(65) Prior Publication Data
US 2009/0164067 A1    Jun. 25, 2009

Related U.S. Application Data

(63) Continuation-in-part of application No. 12/171,399, filed on Jul. 11, 2008, and a continuation-in-part of application No. 10/828,745, filed on Apr. 21, 2004, now abandoned, which is a continuation-in-part of application No. 10/804,758, filed on Mar. 19, 2004, now Pat. No. 7,400,956.

(60) Provisional application No. 60/456,146, filed on Mar. 20, 2003, provisional application No. 60/464,756, filed on Apr. 23, 2003.

(51) Int. Cl.
*G01C 21/28* (2006.01)

(52) U.S. Cl. ............................................. 701/41; 701/50

(58) Field of Classification Search .................... 701/41, 701/29, 50, 23, 25, 213, 215, 205, 408, 412; 342/357.11, 357.77, 357.06, 357.09, 357.31
See application file for complete search history.

(56) References Cited

U.S. PATENT DOCUMENTS
3,585,537 A    6/1971    Rennick et al.
(Continued)

FOREIGN PATENT DOCUMENTS
WO    WO9836288    8/1998
(Continued)

OTHER PUBLICATIONS

Rho, Hyundho et al. "Dual-Frequency GPS Precise Point Positioning with WADGPS Corrections", [retrieved on May 18, 2010]. Retrieved from the Internet: ,URL: http://gauss.gge.unb.ca/papers.pdf/iongnss2005.rho.wadgps.pdf, (Jul. 12, 2006).

(Continued)

*Primary Examiner* — Thomas Black
*Assistant Examiner* — Marthe Marc-Coleman
(74) *Attorney, Agent, or Firm* — Law Office of Mark Brown LLC; Mark E. Brown

(57) ABSTRACT

A global navigation satellite sensor system (GNSS) and gyroscope control system for vehicle steering control comprising a GNSS receiver and antennas at a fixed spacing to determine a vehicle position, velocity and at least one of a heading angle, a pitch angle and a roll angle based on carrier phase position differences. The roll angle facilitates correction of the lateral motion induced position errors resultant from motion of the antennae as the vehicle moves based on an offset to ground and the roll angle. The system also includes a control system configured to receive the vehicle position, heading, and at least one of roll and pitch, and configured to generate a steering command to a vehicle steering system. The system includes gyroscopes for determining system attitude change with respect to multiple axes for integrating with GNSS-derived positioning information to determine vehicle position, velocity, rate-of-turn, attitude and other operating characteristics. A vehicle control method includes the steps of computing a position and a heading for the vehicle using GNSS positioning and a rate gyro for determining vehicle attitude, which is used for generating a steering command. Alternative aspects include multiple-antenna GNSS guidance methods for high-dynamic roll compensation, real-time kinematic (RTK) using single-frequency (L1) receivers, fixed and moving baselines between antennas, multi-position GNSS tail guidance ("breadcrumb following") for crosstrack error correction and guiding multiple vehicles and pieces of equipment relative to each other.

15 Claims, 20 Drawing Sheets

U.S. PATENT DOCUMENTS

| | | | |
|---|---|---|---|
| 3,596,228 A | 7/1971 | Reed, Jr. et al. | |
| 3,727,710 A | 4/1973 | Sanders et al. | |
| 3,815,272 A | 6/1974 | Marleau | |
| 3,899,028 A | 8/1975 | Morris et al. | |
| 3,987,456 A | 10/1976 | Gelin | |
| 4,132,272 A | 1/1979 | Holloway et al. | |
| 4,170,776 A | 10/1979 | MacDoran | |
| 4,180,133 A | 12/1979 | Collogan et al. | |
| 4,398,162 A | 8/1983 | Nagai | |
| 4,453,614 A | 6/1984 | Allen et al. | |
| 4,529,990 A | 7/1985 | Brunner | |
| 4,637,474 A | 1/1987 | Leonard | |
| 4,667,203 A | 5/1987 | Counselman, III | |
| 4,689,556 A | 8/1987 | Cedrone | |
| 4,694,264 A | 9/1987 | Owens et al. | |
| 4,701,760 A * | 10/1987 | Raoux | 340/993 |
| 4,710,775 A | 12/1987 | Coe | |
| 4,714,435 A | 12/1987 | Stipanuk et al. | |
| 4,739,448 A | 4/1988 | Rowe et al. | |
| 4,751,512 A | 6/1988 | Longaker | |
| 4,769,700 A | 9/1988 | Pryor | |
| 4,785,463 A | 11/1988 | Janc et al. | |
| 4,802,545 A | 2/1989 | Nystuen et al. | |
| 4,812,991 A | 3/1989 | Hatch | |
| 4,858,132 A | 8/1989 | Holmquist | |
| 4,864,320 A | 9/1989 | Munson et al. | |
| 4,894,662 A | 1/1990 | Counselman | |
| 4,916,577 A | 4/1990 | Dawkins | |
| 4,918,607 A | 4/1990 | Wible | |
| 4,963,889 A | 10/1990 | Hatch | |
| 5,031,704 A | 7/1991 | Fleischer et al. | |
| 5,100,229 A | 3/1992 | Lundberg et al. | |
| 5,134,407 A | 7/1992 | Lorenz et al. | |
| 5,148,179 A | 9/1992 | Allison | |
| 5,152,347 A | 10/1992 | Miller | |
| 5,155,490 A | 10/1992 | Spradley et al. | |
| 5,155,493 A | 10/1992 | Thursby et al. | |
| 5,156,219 A | 10/1992 | Schmidt et al. | |
| 5,165,109 A | 11/1992 | Han et al. | |
| 5,173,715 A | 12/1992 | Rodal et al. | |
| 5,177,489 A | 1/1993 | Hatch | |
| 5,185,610 A | 2/1993 | Ward et al. | |
| 5,191,351 A | 3/1993 | Hofer et al. | |
| 5,202,829 A | 4/1993 | Geier | |
| 5,207,239 A | 5/1993 | Schwitalia | |
| 5,239,669 A | 8/1993 | Mason et al. | |
| 5,255,756 A | 10/1993 | Follmer et al. | |
| 5,268,695 A | 12/1993 | Dentinger et al. | |
| 5,293,170 A | 3/1994 | Lorenz et al. | |
| 5,294,970 A | 3/1994 | Dornbusch et al. | |
| 5,296,861 A | 3/1994 | Knight | |
| 5,311,149 A | 5/1994 | Wagner et al. | |
| 5,323,322 A | 6/1994 | Mueller et al. | |
| 5,334,987 A | 8/1994 | Teach | |
| 5,343,209 A | 8/1994 | Sennott et al. | |
| 5,344,105 A * | 9/1994 | Youhanaie | 244/3.14 |
| 5,345,245 A | 9/1994 | Ishikawa et al. | |
| 5,359,332 A | 10/1994 | Allison et al. | |
| 5,361,212 A | 11/1994 | Class et al. | |
| 5,365,447 A | 11/1994 | Dennis | |
| 5,369,589 A | 11/1994 | Steiner | |
| 5,375,059 A | 12/1994 | Kyrtsos et al. | |
| 5,390,124 A | 2/1995 | Kyrtsos | |
| 5,390,125 A | 2/1995 | Sennott et al. | |
| 5,390,207 A | 2/1995 | Fenton et al. | |
| 5,416,712 A | 5/1995 | Geier et al. | |
| 5,442,363 A | 8/1995 | Remondi | |
| 5,444,453 A | 8/1995 | Lalezari | |
| 5,451,964 A | 9/1995 | Babu | |
| 5,467,282 A | 11/1995 | Dennis | |
| 5,471,217 A | 11/1995 | Hatch et al. | |
| 5,476,147 A | 12/1995 | Fixemer | |
| 5,477,228 A | 12/1995 | Tiwari et al. | |
| 5,477,458 A | 12/1995 | Loomis | |
| 5,490,073 A | 2/1996 | Kyrtsos | |
| 5,491,636 A | 2/1996 | Robertson | |
| 5,495,257 A | 2/1996 | Loomis | |
| 5,504,482 A | 4/1996 | Schreder | |
| 5,511,623 A | 4/1996 | Frasier | |
| 5,519,620 A | 5/1996 | Talbot et al. | |
| 5,521,610 A | 5/1996 | Rodal | |
| 5,523,761 A | 6/1996 | Gildea | |
| 5,534,875 A | 7/1996 | Diefes et al. | |
| 5,539,398 A * | 7/1996 | Hall et al. | 340/907 |
| 5,543,804 A | 8/1996 | Buchler et al. | |
| 5,546,093 A | 8/1996 | Gudat et al. | |
| 5,548,293 A | 8/1996 | Cohen et al. | |
| 5,561,432 A | 10/1996 | Knight | |
| 5,563,786 A | 10/1996 | Torii | |
| 5,568,152 A | 10/1996 | Janky et al. | |
| 5,568,162 A | 10/1996 | Samsel et al. | |
| 5,583,513 A | 12/1996 | Cohen | |
| 5,589,835 A | 12/1996 | Gildea et al. | |
| 5,592,382 A | 1/1997 | Colley | |
| 5,596,328 A | 1/1997 | Stangeland et al. | |
| 5,600,670 A | 2/1997 | Turney | |
| 5,604,506 A | 2/1997 | Rodal | |
| 5,608,393 A | 3/1997 | Hartman | |
| 5,610,522 A | 3/1997 | Locatelli et al. | |
| 5,610,616 A | 3/1997 | Vallot et al. | |
| 5,610,845 A | 3/1997 | Slabinski | |
| 5,612,883 A | 3/1997 | Shaffer et al. | |
| 5,615,116 A | 3/1997 | Gudat et al. | |
| 5,617,100 A | 4/1997 | Akiyoshi et al. | |
| 5,617,317 A | 4/1997 | Ignagni | |
| 5,621,646 A | 4/1997 | Enge et al. | |
| 5,638,077 A | 6/1997 | Martin | |
| 5,644,139 A | 7/1997 | Allen et al. | |
| 5,646,630 A * | 7/1997 | Sheynblat et al. | 342/357.31 |
| 5,664,632 A | 9/1997 | Frasier | |
| 5,673,491 A | 10/1997 | Brenna et al. | |
| 5,680,140 A | 10/1997 | Loomis | |
| 5,684,696 A | 11/1997 | Rao et al. | |
| 5,706,015 A | 1/1998 | Chen et al. | |
| 5,717,593 A | 2/1998 | Gvili | |
| 5,725,230 A | 3/1998 | Walkup | |
| 5,731,786 A | 3/1998 | Abraham et al. | |
| 5,739,785 A | 4/1998 | Allison et al. | |
| 5,757,316 A | 5/1998 | Buchler | |
| 5,765,123 A | 6/1998 | Nimura et al. | |
| 5,777,578 A | 7/1998 | Chang et al. | |
| 5,810,095 A | 9/1998 | Orbach et al. | |
| 5,828,336 A | 10/1998 | Yunck et al. | |
| 5,838,562 A | 11/1998 | Gudat et al. | |
| 5,854,987 A | 12/1998 | Sekine et al. | |
| 5,862,501 A | 1/1999 | Talbot et al. | |
| 5,864,315 A | 1/1999 | Welles et al. | |
| 5,864,318 A | 1/1999 | Cozenza et al. | |
| 5,875,408 A | 2/1999 | Bendett | |
| 5,877,725 A | 3/1999 | Kalafus | |
| 5,890,091 A | 3/1999 | Talbot et al. | |
| 5,899,957 A | 5/1999 | Loomis | |
| 5,906,645 A | 5/1999 | Kagawa et al. | |
| 5,912,798 A | 6/1999 | Chu | |
| 5,914,685 A | 6/1999 | Kozlov et al. | |
| 5,917,448 A | 6/1999 | Mickelson | |
| 5,918,558 A | 7/1999 | Susag | |
| 5,919,242 A | 7/1999 | Greatline et al. | |
| 5,923,270 A | 7/1999 | Sampo et al. | |
| 5,926,079 A | 7/1999 | Heine et al. | |
| 5,927,603 A | 7/1999 | McNabb | |
| 5,928,309 A | 7/1999 | Korver et al. | |
| 5,929,721 A | 7/1999 | Munn et al. | |
| 5,933,110 A | 8/1999 | Tang | |
| 5,935,183 A | 8/1999 | Sahm et al. | |
| 5,936,573 A | 8/1999 | Smith | |
| 5,940,026 A | 8/1999 | Popeck | |
| 5,941,317 A | 8/1999 | Mansur | |
| 5,943,008 A | 8/1999 | Van Dusseldorp | |
| 5,944,770 A | 8/1999 | Enge et al. | |
| 5,945,917 A | 8/1999 | Harry | |
| 5,949,371 A | 9/1999 | Nichols | |
| 5,955,973 A | 9/1999 | Anderson | |
| 5,956,250 A | 9/1999 | Gudat et al. | |
| 5,969,670 A | 10/1999 | Kalafus et al. | |
| 5,987,383 A | 11/1999 | Keller et al. | |
| 6,014,101 A | 1/2000 | Loomis | |

| | | | |
|---|---|---|---|
| 6,014,608 A | 1/2000 | Seo | |
| 6,018,313 A | 1/2000 | Englemayer et al. | |
| 6,023,239 A | 2/2000 | Kovach | |
| 6,052,647 A * | 4/2000 | Parkinson et al. ............ 701/215 | |
| 6,055,477 A | 4/2000 | McBurney et al. | |
| 6,057,800 A | 5/2000 | Yang et al. | |
| 6,061,390 A | 5/2000 | Meehan et al. | |
| 6,061,632 A | 5/2000 | Dreier | |
| 6,062,317 A | 5/2000 | Gharsalli | |
| 6,069,583 A | 5/2000 | Silvestrin et al. | |
| 6,076,612 A | 6/2000 | Carr et al. | |
| 6,081,171 A | 6/2000 | Ella | |
| 6,100,842 A | 8/2000 | Dreier et al. | |
| 6,104,978 A | 8/2000 | Harrison et al. | |
| 6,122,595 A | 9/2000 | Varley et al. | |
| 6,128,574 A | 10/2000 | Diekhans | |
| 6,144,335 A | 11/2000 | Rogers | |
| 6,191,730 B1 | 2/2001 | Nelson, Jr. | |
| 6,191,732 B1 * | 2/2001 | Carlson et al. ............ 342/357.3 | |
| 6,191,733 B1 | 2/2001 | Dizchavez | |
| 6,198,430 B1 | 3/2001 | Hwang et al. | |
| 6,198,992 B1 | 3/2001 | Winslow | |
| 6,199,000 B1 | 3/2001 | Keller et al. | |
| 6,205,401 B1 | 3/2001 | Pickhard et al. | |
| 6,215,828 B1 | 4/2001 | Signell et al. | |
| 6,229,479 B1 | 5/2001 | Kozlov et al. | |
| 6,230,097 B1 | 5/2001 | Dance et al. | |
| 6,233,511 B1 | 5/2001 | Berger et al. | |
| 6,236,916 B1 | 5/2001 | Staub et al. | |
| 6,236,924 B1 | 5/2001 | Motz | |
| 6,253,160 B1 | 6/2001 | Hanseder | |
| 6,256,583 B1 | 7/2001 | Sutton | |
| 6,259,398 B1 | 7/2001 | Riley | |
| 6,266,595 B1 | 7/2001 | Greatline et al. | |
| 6,271,788 B1 * | 8/2001 | Longaker et al. ........ 342/357.31 | |
| 6,285,320 B1 | 9/2001 | Olster et al. | |
| 6,292,132 B1 | 9/2001 | Wilson | |
| 6,307,505 B1 | 10/2001 | Green | |
| 6,313,788 B1 | 11/2001 | Wilson | |
| 6,314,348 B1 | 11/2001 | Winslow | |
| 6,325,684 B1 | 12/2001 | Knight | |
| 6,336,066 B1 | 1/2002 | Pellenc et al. | |
| 6,345,231 B2 | 2/2002 | Quincke | |
| 6,356,602 B1 | 3/2002 | Rodal et al. | |
| 6,377,889 B1 | 4/2002 | Soest | |
| 6,380,888 B1 | 4/2002 | Kucik | |
| 6,389,345 B2 | 5/2002 | Phelps | |
| 6,392,589 B1 | 5/2002 | Rogers et al. | |
| 6,397,147 B1 | 5/2002 | Whitehead | |
| 6,415,229 B1 | 7/2002 | Diekhans | |
| 6,418,031 B1 | 7/2002 | Archambeault | |
| 6,421,003 B1 | 7/2002 | Riley et al. | |
| 6,424,915 B1 | 7/2002 | Fukuda et al. | |
| 6,431,576 B1 | 8/2002 | Viaud et al. | |
| 6,434,462 B1 | 8/2002 | Bevly et al. | |
| 6,445,983 B1 | 9/2002 | Dickson et al. | |
| 6,445,990 B1 | 9/2002 | Manring | |
| 6,449,558 B1 | 9/2002 | Small | |
| 6,463,091 B1 | 10/2002 | Zhodzicshsky et al. | |
| 6,463,374 B1 | 10/2002 | Keller et al. | |
| 6,466,871 B1 | 10/2002 | Reisman et al. | |
| 6,469,663 B1 | 10/2002 | Whitehead et al. | |
| 6,484,097 B2 | 11/2002 | Fuchs et al. | |
| 6,501,422 B1 | 12/2002 | Nichols | |
| 6,515,619 B1 | 2/2003 | McKay, Jr. | |
| 6,516,271 B2 | 2/2003 | Upadhyaya et al. | |
| 6,539,303 B2 | 3/2003 | McClure et al. | |
| 6,542,077 B2 | 4/2003 | Joao | |
| 6,549,835 B2 | 4/2003 | Deguchi | |
| 6,553,299 B1 | 4/2003 | Keller et al. | |
| 6,553,300 B2 | 4/2003 | Ma et al. | |
| 6,553,311 B2 | 4/2003 | Ahearn et al. | |
| 6,570,534 B2 | 5/2003 | Cohen et al. | |
| 6,577,952 B2 | 6/2003 | Geier et al. | |
| 6,587,761 B2 | 7/2003 | Kumar | |
| 6,606,542 B2 | 8/2003 | Hauwiller et al. | |
| 6,611,228 B2 | 8/2003 | Toda et al. | |
| 6,611,754 B2 | 8/2003 | Klein | |
| 6,611,755 B1 | 8/2003 | Coffee et al. | |
| 6,622,091 B2 | 9/2003 | Perlmutter et al. | |
| 6,631,394 B1 | 10/2003 | Ronkka et al. | |
| 6,631,916 B1 | 10/2003 | Miller | |
| 6,643,576 B1 | 11/2003 | O'Connor et al. | |
| 6,646,603 B2 | 11/2003 | Dooley et al. | |
| 6,657,875 B1 | 12/2003 | Zeng et al. | |
| 6,671,587 B2 | 12/2003 | Hrovat et al. | |
| 6,686,878 B1 | 2/2004 | Lange | |
| 6,688,403 B2 | 2/2004 | Bernhardt et al. | |
| 6,703,973 B1 | 3/2004 | Nichols | |
| 6,711,501 B2 | 3/2004 | McClure et al. | |
| 6,721,638 B2 | 4/2004 | Zeitler | |
| 6,732,024 B2 | 5/2004 | Rekow et al. | |
| 6,744,404 B1 | 6/2004 | Whitehead et al. | |
| 6,754,584 B2 | 6/2004 | Pinto et al. | |
| 6,774,843 B2 | 8/2004 | Takahashi | |
| 6,792,380 B2 | 9/2004 | Toda | |
| 6,819,269 B2 | 11/2004 | Flick | |
| 6,822,314 B2 | 11/2004 | Beasom | |
| 6,865,465 B2 | 3/2005 | McClure | |
| 6,865,484 B2 | 3/2005 | Miyasaka et al. | |
| 6,879,283 B1 | 4/2005 | Bird et al. | |
| 6,900,992 B2 | 5/2005 | Kelly et al. | |
| 6,922,635 B2 | 7/2005 | Rorabaugh | |
| 6,931,233 B1 | 8/2005 | Tso et al. | |
| 6,961,018 B2 | 11/2005 | Heppe et al. | |
| 6,967,538 B2 | 11/2005 | Woo | |
| 6,990,399 B2 | 1/2006 | Hrazdera et al. | |
| 7,006,032 B2 | 2/2006 | King et al. | |
| 7,026,982 B2 | 4/2006 | Toda et al. | |
| 7,027,918 B2 | 4/2006 | Zimmerman et al. | |
| 7,031,725 B2 | 4/2006 | Rorabaugh | |
| 7,089,099 B2 | 8/2006 | Shostak et al. | |
| 7,142,956 B2 | 11/2006 | Heiniger et al. | |
| 7,155,335 B2 | 12/2006 | Rennels | |
| 7,162,348 B2 | 1/2007 | McClure et al. | |
| 7,191,061 B2 | 3/2007 | McKay et al. | |
| 7,221,314 B2 | 5/2007 | Brabec et al. | |
| 7,231,290 B2 | 6/2007 | Steichen et al. | |
| 7,248,211 B2 | 7/2007 | Hatch et al. | |
| 7,271,766 B2 | 9/2007 | Zimmerman et al. | |
| 7,277,784 B2 | 10/2007 | Weiss | |
| 7,292,186 B2 | 11/2007 | Miller et al. | |
| 7,324,915 B2 | 1/2008 | Altman | |
| 7,358,896 B2 | 4/2008 | Gradincic et al. | |
| 7,373,231 B2 | 5/2008 | McClure et al. | |
| 7,388,539 B2 | 6/2008 | Whitehead et al. | |
| 7,395,769 B2 | 7/2008 | Jensen | |
| 7,428,259 B2 | 9/2008 | Wang et al. | |
| 7,437,230 B2 | 10/2008 | McClure et al. | |
| 7,451,030 B2 | 11/2008 | Eglington et al. | |
| 7,479,900 B2 | 1/2009 | Horstemeyer | |
| 7,505,848 B2 | 3/2009 | Flann et al. | |
| 7,522,099 B2 | 4/2009 | Zhodzishsky et al. | |
| 7,522,100 B2 | 4/2009 | Yang et al. | |
| 7,571,029 B2 | 8/2009 | Dai et al. | |
| 7,689,354 B2 | 3/2010 | Heiniger et al. | |
| 2002/0165645 A1 * | 11/2002 | Kageyama ........................ 701/1 |
| 2003/0014171 A1 | 1/2003 | Ma et al. | |
| 2003/0093210 A1 | 5/2003 | Kondo et al. | |
| 2003/0187560 A1 | 10/2003 | Keller et al. | |
| 2003/0208319 A1 | 11/2003 | Ell et al. | |
| 2004/0039514 A1 | 2/2004 | Steichen et al. | |
| 2004/0212533 A1 | 10/2004 | Whitehead et al. | |
| 2005/0080559 A1 | 4/2005 | Ishibashi et al. | |
| 2005/0225955 A1 | 10/2005 | Grebenkemper et al. | |
| 2005/0265494 A1 | 12/2005 | Goodlings | |
| 2006/0031664 A1 | 2/2006 | Wilson et al. | |
| 2006/0167600 A1 | 7/2006 | Nelson et al. | |
| 2006/0206246 A1 | 9/2006 | Walker | |
| 2006/0215739 A1 | 9/2006 | Williamson et al. | |
| 2007/0078570 A1 | 4/2007 | Dai et al. | |
| 2007/0088447 A1 | 4/2007 | Stothert et al. | |
| 2007/0121708 A1 | 5/2007 | Simpson | |
| 2007/0205940 A1 | 9/2007 | Yang et al. | |
| 2007/0285308 A1 | 12/2007 | Bauregger et al. | |
| 2008/0129586 A1 | 6/2008 | Martin | |
| 2008/0204312 A1 | 8/2008 | Euler | |
| 2009/0171583 A1 | 7/2009 | DiEsposti | |

| | | | | | | |
|---|---|---|---|---|---|---|
| 2009/0174597 A1 | 7/2009 | DiLellio et al. | | 2010/0188286 A1 | 7/2010 | Bickerstaff et al. |
| 2009/0174622 A1 | 7/2009 | Kanou | | 2010/0189163 A1 | 7/2010 | Burgi et al. |
| 2009/0177395 A1 | 7/2009 | Stelpstra | | 2010/0207811 A1 | 8/2010 | Lackey |
| 2009/0177399 A1 | 7/2009 | Park et al. | | 2010/0210206 A1 | 8/2010 | Young |
| 2009/0259397 A1 | 10/2009 | Stanton | | 2010/0211248 A1 | 8/2010 | Craig et al. |
| 2009/0259707 A1 | 10/2009 | Martin et al. | | 2010/0211315 A1 | 8/2010 | Toda |
| 2009/0262014 A1 | 10/2009 | DiEsposti | | 2010/0211316 A1 | 8/2010 | DaSilva |
| 2009/0262018 A1 | 10/2009 | Vasilyev et al. | | 2010/0220004 A1 | 9/2010 | Malkos et al. |
| 2009/0262974 A1 | 10/2009 | Lithopoulos | | 2010/0220008 A1 | 9/2010 | Conover et al. |
| 2009/0265054 A1 | 10/2009 | Basnayake | | 2010/0222076 A1 | 9/2010 | Poon et al. |
| 2009/0265101 A1 | 10/2009 | Jow | | 2010/0225537 A1 | 9/2010 | Abraham |
| 2009/0265104 A1 | 10/2009 | Shroff | | 2010/0228408 A1 | 9/2010 | Ford |
| 2009/0265308 A1 | 10/2009 | Brown | | 2010/0228480 A1 | 9/2010 | Lithgow et al. |
| 2009/0273372 A1 | 11/2009 | Brenner | | 2010/0231443 A1 | 9/2010 | Whitehead |
| 2009/0273513 A1 | 11/2009 | Huang | | 2010/0231446 A1 | 9/2010 | Marshall et al. |
| 2009/0274079 A1 | 11/2009 | Bhatia et al. | | 2010/0232351 A1 | 9/2010 | Chansarkar et al. |
| 2009/0274113 A1 | 11/2009 | Katz | | 2010/0235093 A1 | 9/2010 | Chang |
| 2009/0276155 A1 | 11/2009 | Jeerage et al. | | 2010/0238976 A1 | 9/2010 | Young |
| 2009/0295633 A1 | 12/2009 | Pinto et al. | | 2010/0241347 A1 | 9/2010 | King et al. |
| 2009/0295634 A1 | 12/2009 | Yu et al. | | 2010/0241353 A1 | 9/2010 | Park |
| 2009/0299550 A1 | 12/2009 | Baker | | 2010/0241441 A1 | 9/2010 | Page et al. |
| 2009/0322597 A1 | 12/2009 | Medina Herrero et al. | | 2010/0241864 A1 | 9/2010 | Kelley et al. |
| 2009/0322598 A1 | 12/2009 | Fly et al. | | | | |
| 2009/0322600 A1 | 12/2009 | Whitehead et al. | | | | |
| 2009/0322601 A1 | 12/2009 | Ladd et al. | | | | |

FOREIGN PATENT DOCUMENTS

| | | |
|---|---|---|
| WO | WO0024239 | 5/2000 |
| WO | WO03019430 | 3/2003 |
| WO | WO2005/119386 | 12/2005 |
| WO | WO2009/066183 | 5/2009 |
| WO | WO-2009082745 | 7/2009 |
| WO | WO-2010005945 | 7/2009 |
| WO | WO2009126587 | 10/2009 |
| WO | WO2009/148638 | 12/2009 |
| WO | WO-2010/042131 | 4/2010 |
| WO | WO-2010104782 | 9/2010 |
| WO | WO-2011014431 | 2/2011 |

| | | |
|---|---|---|
| 2009/0322606 A1 | 12/2009 | Gronemeyer |
| 2009/0326809 A1 | 12/2009 | Colley et al. |
| 2010/0013703 A1 | 1/2010 | Tekawy et al. |
| 2010/0026569 A1 | 2/2010 | Amidi |
| 2010/0030470 A1 | 2/2010 | Wang et al. |
| 2010/0039316 A1 | 2/2010 | Gronemeyer et al. |
| 2010/0039318 A1 | 2/2010 | Kmiecik |
| 2010/0039320 A1 | 2/2010 | Boyer et al. |
| 2010/0039321 A1 | 2/2010 | Abraham |
| 2010/0060518 A1 | 3/2010 | Bar-Sever et al. |
| 2010/0063649 A1 | 3/2010 | Wu et al. |
| 2010/0084147 A1 | 4/2010 | Aral |
| 2010/0085249 A1 | 4/2010 | Ferguson et al. |
| 2010/0085253 A1 | 4/2010 | Ferguson et al. |
| 2010/0103033 A1 | 4/2010 | Roh |
| 2010/0103034 A1 | 4/2010 | Tobe et al. |
| 2010/0103038 A1 | 4/2010 | Yeh et al. |
| 2010/0103040 A1 | 4/2010 | Broadbent |
| 2010/0106414 A1 | 4/2010 | Whitehead |
| 2010/0106445 A1 | 4/2010 | Kondoh |
| 2010/0109944 A1 | 5/2010 | Whitehead et al. |
| 2010/0109945 A1 | 5/2010 | Roh |
| 2010/0109947 A1 | 5/2010 | Rintanen |
| 2010/0109948 A1 | 5/2010 | Razoumov et al. |
| 2010/0109950 A1 | 5/2010 | Roh |
| 2010/0111372 A1 | 5/2010 | Zheng et al. |
| 2010/0114483 A1 | 5/2010 | Heo et al. |
| 2010/0117894 A1 | 5/2010 | Velde et al. |
| 2010/0117899 A1 | 5/2010 | Papadimitratos et al. |
| 2010/0117900 A1 | 5/2010 | van Diggelen et al. |
| 2010/0121577 A1 | 5/2010 | Zhang et al. |
| 2010/0124210 A1 | 5/2010 | Lo |
| 2010/0124212 A1 | 5/2010 | Lo |
| 2010/0134354 A1 | 6/2010 | Lennen |
| 2010/0149025 A1 | 6/2010 | Meyers et al. |
| 2010/0149030 A1 | 6/2010 | Verma et al. |
| 2010/0149033 A1 | 6/2010 | Abraham |
| 2010/0149034 A1 | 6/2010 | Chen |
| 2010/0149037 A1 | 6/2010 | Cho |
| 2010/0150284 A1 | 6/2010 | Fielder et al. |
| 2010/0152949 A1 | 6/2010 | Nunan et al. |
| 2010/0156709 A1 | 6/2010 | Zhang et al. |
| 2010/0156712 A1 | 6/2010 | Pisz et al. |
| 2010/0156718 A1 | 6/2010 | Chen |
| 2010/0159943 A1 | 6/2010 | Salmon |
| 2010/0161179 A1 | 6/2010 | McClure et al. |
| 2010/0161211 A1 | 6/2010 | Chang |
| 2010/0161568 A1 | 6/2010 | Xiao |
| 2010/0171660 A1 | 7/2010 | Shyr et al. |
| 2010/0171757 A1 | 7/2010 | Melamed |
| 2010/0185364 A1 | 7/2010 | McClure |
| 2010/0185366 A1 | 7/2010 | Heiniger et al. |
| 2010/0185389 A1 | 7/2010 | Woodard |
| 2010/0188285 A1 | 7/2010 | Collins |

OTHER PUBLICATIONS

"Eurocontrol, Pegasus Technical Notes on SBAS", report [online], Dec. 7, 2004 [retrieved on May 18, 2010]. Retrieved from the Internet: <URL: http://www.icao.int/icao/en/ro/nacc/meetings/2004/gnss/documentation/Pegasus/tn.pdf>, (Dec. 7, 2004), p. 89 paras [0001]-[0004].

"ARINC Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf>, (Dec. 7, 2004), p. 168 para [0001].

Schaer, et al., "Determination and Use of GPS Differential Code Bias Values", Presentation [online]. Revtrieved May 18, 2010. Retrieved from the internet: <http://nng.esoc.esa.de/ws2006/REPR2.pdf>(May 8, 2006).

"International Search Report", PCT/US10/26509., (Apr. 20, 2010).

"International Search Report", PCT/US09/067693, Mar. 3, 2010.

"International Search Report and Written Opinion", PCT/US10/21334, (Mar. 12, 2010).

Parkinson, Bradford W., et al., "Global Positioning System: Theory and Applications, vol. II", Bradford W. Parkinson and James J. Spiker, Jr., eds., *Global Postioning System: Theory and Applications, vol. II, 1995, AIAA*, Reston, VA, USA, pp. 3-50, (1995),3-50.

"Orthman Manufacturing Co., www.orthman.com/htm;guidance.htnn", 2004, regarding the "Tracer Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers* vol. 1, Monetrey, California American Institute of Aeronautics and Astronautics, Inc., (May 2004), 136-143.

Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware (EH'02)*, (2002).

Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc.

Park, Chansik et al., "Integer Ambiguity Resolution for GPS Based Attitude Determination System", *SICE 1998*, Jul. 29-31, Chiba, 1115-1120.

Last, J. D., et al., "Effect of skywave interference on coverage of radiobeacon DGPS stations", *IEEE Proc.-Radar, Sonar Navig.*, vol. 144, No. 3, Jun. 1997, pp. 163-168.

"International Search Report and Written Opinion", PCT/US2004/015678, filed May 17, 2004, Jun. 21, 2005.

"ISO", 11783 Part 7 Draft Amendment 1 Annex, Paragraphs B.6 and B.7.ISO 11783-7 2004 DAM1, ISO: Mar. 8, 2004.

Kaplan, E D., "Understanding GPS: Principles and Applications", Artech House, MA, 1996.

Irsigler, M et al., "PPL Tracking Performance in the Presence of Oscillator Phase Noise", *GPS Solutions*, vol. 5, No. 4, pp. 45-57 (2002).

Ward, Phillip W., "Performance Comparisons Between FLL, PLL and a Novel FLL-Assisted-PLL Carrier Tracking Loop Under RF Interference Conditions", *11th Int. Tech Meeting of the Satellite Division of the U.S. Inst. of Navigation*, Nashville, TN, Sep. 15-18, 783-795, 1998.

Bevly, David M., "Comparison of INS v. Carrier-Phase DGPS for Attitude Determination in the Control of Off-Road Vehicles", *ION 55th Annual Meeting;* Jun. 28-30, 1999; Cambridge, Massachusetts; pp. 497-504.

Keicher, R. et al., "Automatic Guidance for Agricultural Vehicles in Europe", *Computers and Electronics in Agriculture*, vol. 25, (Jan. 2000),169-194.

Takac, Frank et al., "SmartRTK: A Novel Method of Processing Standardised RTCM Network RTK Information for High Precision Positioning", *Proceedings of ENC GNSS 2008*, Toulouse, France,(Apr. 22, 2008).

"International Search Report", PCT/US09/33567, (Feb. 9, 2009).

"International Search Report", PCT/US09/49776, (Aug. 11, 2009).

"International Search Report", PCT/AU/2008/000002, (Feb. 28, 2008).

"International Search Report and Written Opinion", PCT/IB2008/003796,, (Jul. 15, 2009).

"International Search Report", PCT/US09/33693, (Mar. 30, 2009).

"International Search Report", PCT/US09/039686, (May 26, 2009).

"International Search Report,", PCT/US09/34376, (Nov. 2, 2009).

"International Search Report and Written Opinion", *International Searching Authority*, PCT/US08/88070, Feb. 9, 2009.

"International Search Report / Written Opinion", PCT/US09/63594, Jan. 11, 2010.

"International Search Report", PCT/US09/60668, Dec. 9, 2009.

"ISR Notification & Written Opinion", PCT/US10/26509, (Apr. 20, 2010),1-7.

"Notification Concerning Transmittal of International Preliminary Report on Patentability", PCT/US2009/049776, (Jan. 20, 2011).

"Notification Concerning Transmittal of International Report on Patentability (PCT)", PCT/US2009/049776, (Jan. 20, 2011).

"Notification of Transmittal of InternatinalPrelim. Report of Patentability", International Application No. PCT/US09/039686, (Oct. 21, 2010).

"International Search Report and Written Opinion", PCT/US2010/043094, (Sep. 17, 2010).

"Notification of Publication of International Application", WO 2011/014431, (Feb. 3, 2011).

"International Search Report and Written Opinion", PCT/US08/81727, (Dec. 23, 2008).

* cited by examiner

Yaw Attitude

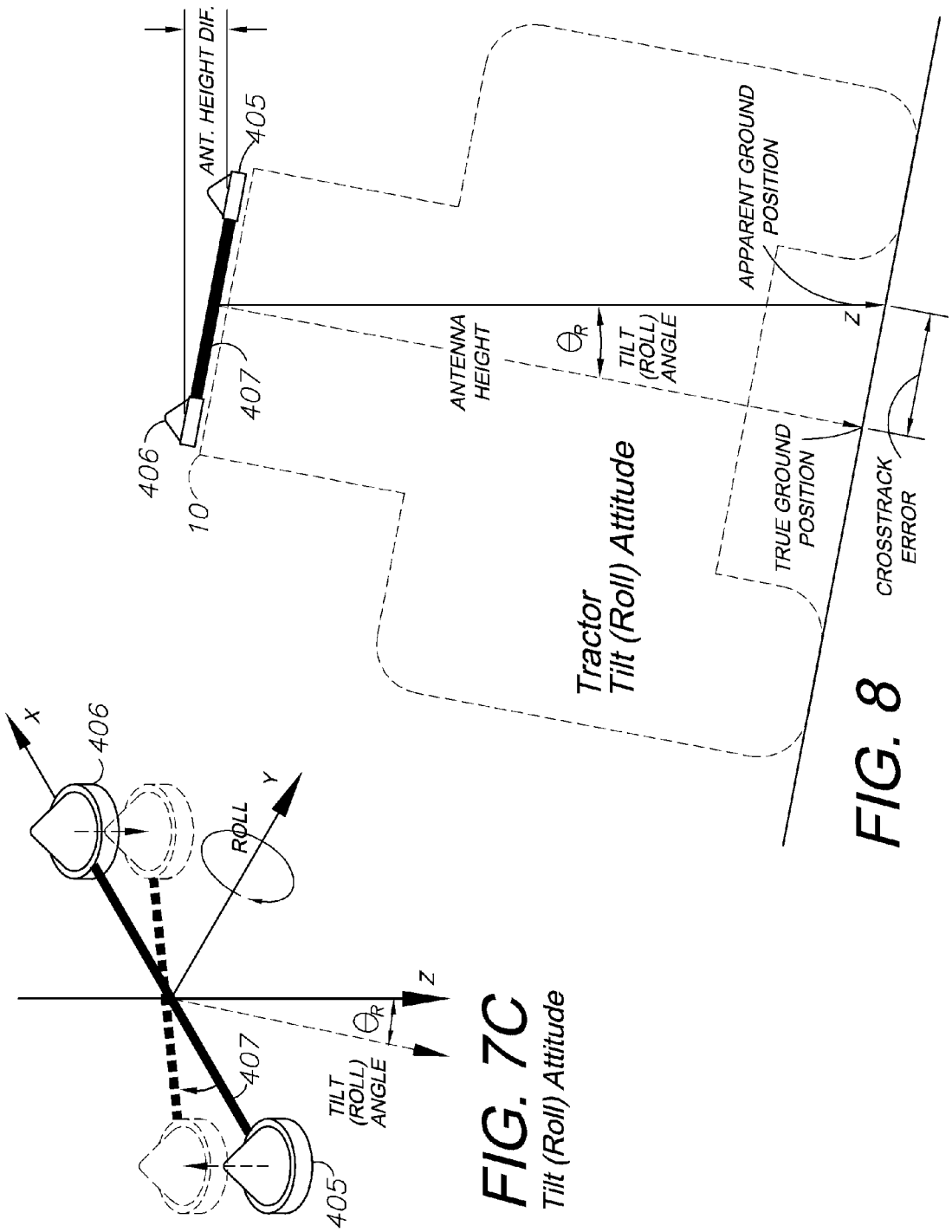

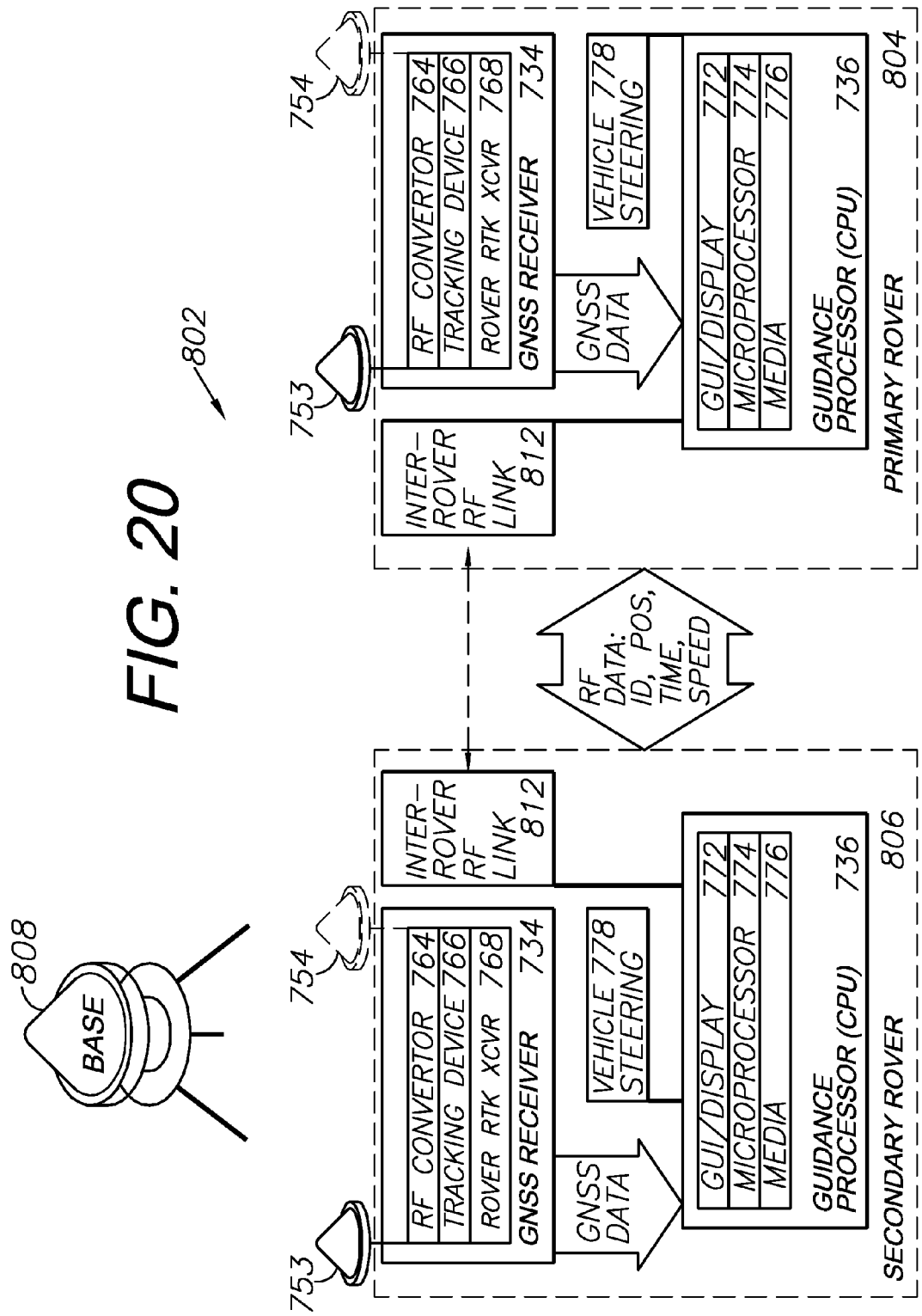

MULTIPLE-ANTENNA GNSS CONTROL SYSTEM AND METHOD

CROSS-REFERENCE TO RELATED APPLICATIONS

This application is a continuation-in-part of and claims the benefit of: U.S. patent applications Ser. No. 12/171,399, filed Jul. 11, 2008, which is a continuation-in-part of Ser. No. 10/804,758, filed Mar. 19, 2004; now U.S. Pat. No. 7,400,956 Ser. No. 10/828,745, filed Apr. 21, 2004; now abandoned and U.S. Provisional Patent Applications No. 60/456,146, filed Mar. 20, 2003 and No. 60/464,756, filed Apr. 23, 2003. The contents of all of the aforementioned applications are incorporated by reference herein in their entireties.

BACKGROUND OF THE INVENTION

The invention relates generally to automatic guidance systems and more specifically to a multiple-antenna global navigation satellite system (GNSS) and method for vehicle and implement guidance and steering control.

Movable machinery, such as agricultural equipment, open-pit mining machines, airplane crop dusters and the like all benefit from accurate global navigation satellite system (GNSS) high precision survey products, and others. However, in existing satellite positioning systems (SATPS) for guided parallel and contour swathing for precision farming, mining, and the like, the actual curvature of terrain may not be taken into account. This results in a less than precise production because of the less than precise parallel or contour swathing. Indeed, in order to provide swaths through a field (in farming, for example), the guidance system collects positions of the vehicle as it moves across the field. When the vehicle commences the next pass through the field, the guidance system offsets the collected positions for the previous pass by the width of the equipment (i.e. swath width). The next set of swath positions is used to provide guidance to the operator as he or she drives the vehicle through the field.

The current vehicle location, as compared to the desired swath location, is provided to the vehicle's operator or to a vehicle's steering system. The SATPS provides the 3-D location of signal reception (for instance, the 3-D location of the antenna). If only 3-D coordinates are collected, the next swath computations assume a flat terrain offset. However, the position of interest is often not the same as where the satellite receiver (SR) is located since the SR is placed in the location for good signal reception, for example, for a tractor towing an implement, the best location for the SR may be on top of the cab. However, the position of interest (POI) for providing guidance to the tractor operator may be the position on the ground below the operator. If the tractor is on flat terrain, determining this POI is a simple adjustment to account for the antenna height.

However, if the tractor is on an inclined terrain with a variable tilt, which is often the case, the SATPS alone cannot determine the terrain tilt so the POI also cannot be determined. This results in a guidance error because the POI is approximated by the point of reception (POR), and this approximation worsens as the terrain inclination increases. This results in cross track position excursions relative to the vehicle ground track which would contaminate any attempt to guide to a defined field line or swath. On inclined terrain, this error can be minimized by collecting the vehicle tilt configuration along each current pass or the previous pass. The swath offset thus becomes a vector taking the terrain inclination into account with the assumption that from the first swath to the next one the terrain inclination does not change too much. It can therefore be seen that there is a need for a better navigation/guidance system for use with a ground-based vehicle that measures and takes into account vehicle tilt.

Various navigation systems for ground-based vehicles have been employed but each includes particular disadvantages. Systems using Doppler radar will encounter errors with the radar and latency. Similarly, gyroscopes, which may provide heading, roll, or pitch measurements, may be deployed as part of an inertial navigation package, but tend to encounter drift errors and biases and still require some external attitude measurements for gyroscope initialization and drift compensation. Gyroscopes have good short-term characteristics but undesirable long-term characteristics, especially those gyroscopes of lower cost such as those based on a vibrating resonator. Similarly, inertial systems employing gyroscopes and accelerometers have good short-term characteristics but also suffer from drift. Various systems include navigating utilizing GNSS; however, these systems also exhibit disadvantages. Existing GNSS position computations may include lag times, which may be especially troublesome when, for example, GNSS velocity is used to derive vehicle heading. As a result, the position (or heading) solution provided by a GNSS receiver tells a user where the vehicle was a moment ago, but not in real time. Existing GNSS systems do not provide high quality heading information at slower vehicle speeds. Therefore, what is needed is a low cost sensor system to facilitate vehicle swath navigation that makes use of the desirable behavior of both GNSS and inertial units while eliminating or reducing non-desirable behavior. Specifically, what is needed is a means to employ low-cost gyroscopes (e.g., micro electromechanical (MEM) gyroscopes) which exhibit very good short-term low noise and high accuracy while removing their inherent long-term drift.

Providing multiple antennas on a vehicle can provide additional benefits by determining an attitude of the vehicle from the GNSS ranging signals received by its antennas, which are constrained on the vehicle at a predetermined spacing. For example, high dynamic roll compensation signals can be output directly to the vehicle steering using GNSS-derived attitude information. Components such as gyroscopes and accelerometers can be eliminated using such techniques. Real-time kinematic (RTK) can be accomplished using relatively economical single frequency L1-only receivers with inputs from at least two antennas mounted in fixed relation on a rover vehicle. Still further, moving baselines can be provided for positioning solutions involving tractors and implements and multi-vehicle GNSS control can be provided.

SUMMARY OF THE INVENTION

Disclosed herein in an exemplary embodiment is a sensor system for vehicle steering control comprising: a plurality of global navigation satellite systems (GNSS) including receivers and antennas at a fixed spacing to determine a vehicle position, velocity and at least one of a heading angle, a pitch angle and a roll angle based on carrier phase corrected real time kinematic (RTK) position differences. The roll angle facilitates correction of the lateral motion induced position errors resultant from motion of the antennae as the vehicle moves based on an offset to ground and the roll angle. The system also includes a control system configured to receive the vehicle position, heading, and at least one of roll, pitch and yaw, and configured to generate a steering command to a vehicle steering system.

Also disclosed herein in another exemplary embodiment is a method for computing a position of a vehicle comprising:

initializing GNSS; computing a first position of a first GNSS antenna on the vehicle; computing a second position of a second GNSS antenna; and calculating a heading as a vector perpendicular to a vector joining the first position and the second position, in a horizontal plane aligned with the vehicle. The method also includes computing a roll angle of the vehicle as an arc-tangent of a ratio of differences in heights of the first GNSS antenna and the second GNSS antenna divided by a spacing between their respective phase centers and calculating an actual position at the center of the vehicle projected to the ground using the computed roll angle and a known height from the ground of at least one of the first GNSS antenna and the second GNSS antenna.

Further disclosed herein in yet another exemplary embodiment is a method of controlling a vehicle comprising: computing a position and a heading for the vehicle; computing a steering control command based on a proportionality factor multiplied by a difference in a desired position versus an actual position, plus a second proportionality factor multiplied by a difference in a desired heading versus an actual heading, the second proportionality factor ensuring that when the vehicle attains the desired position the vehicle is also directed to the desired heading, and thereby avoiding crossing a desired track. The method also includes a recursive adaptive algorithm employed to characterize the vehicle response and selected dynamic characteristics.

The method further includes applying selected control values to a vehicle steering control mechanism and measuring responses of the vehicle thereto; calculating response times and characteristics for the vehicle based on the responses; and calibrating the control commands by applying a modified control command based on the responses to achieve a desired response. Various alternative aspects and applications of the present invention are disclosed herein.

Additional alternative aspects include selective sprayer nozzle control, high dynamic roll compensation using GNSS attitude solutions from multiple antennas, moving baseline implement positioning and multiple vehicle control.

BRIEF DESCRIPTION OF THE DRAWINGS

FIG. 7C depicts the system in a roll attitude;

FIG. 8 depicts a tilt (roll) angle measuring application of the invention on an agricultural vehicle;

FIG. 20 depicts a block diagram of the system shown in FIG. 19.

DETAILED DESCRIPTION OF THE PREFERRED ASPECTS

I. GNSS Introduction

Figure 1:
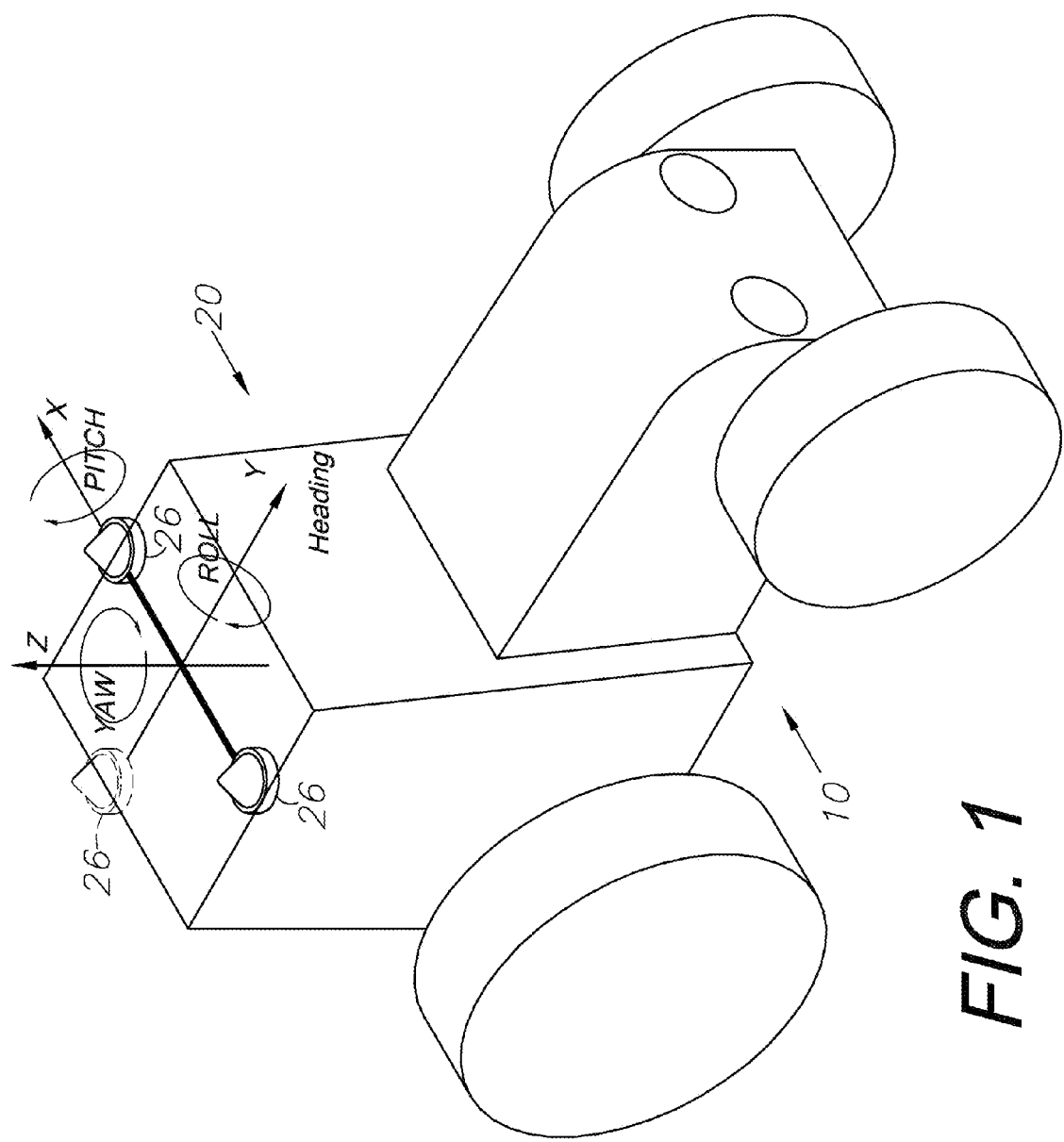
FIG. 1 depicts an illustrative diagram of a vehicle including an exemplary embodiment.

Global navigation satellite systems (GNSS) are broadly defined to include GPS (U.S.), Galileo (proposed), GLONASS (Russia), Beidou/Compass (China, proposed), IRNSS (India, proposed), QZSS (Japan, proposed) and other current and future positioning technology using signals from satellites, with or without augmentation from terrestrial sources. Inertial navigation systems (INS) include gyroscopic (gyro) sensors, accelerometers and similar technologies for providing output corresponding to the inertia of moving components in all axes, i.e. through six degrees of freedom (positive and negative directions along transverse X, longitudinal Y and vertical Z axes). Yaw, pitch and roll refer to moving component rotation about the Z, X and Y axes respectively. Said terminology will include the words specifically mentioned, derivatives thereof and words of similar meaning.

Disclosed herein in an exemplary embodiment is a sensor system for vehicle guidance. The sensor system utilizes a plurality of GNSS carrier phase differenced antennas to derive attitude information, herein referred to as a GNSS attitude system. Moreover, the GNSS attitude system may optionally be combined with one or more rate gyro(s) used to measure turn, roll or pitch rates and to further calibrate bias and scale factor errors within these gyros. In an exemplary embodiment, the rate gyros and GNSS receiver/antenna are integrated together within the same unit, to provide multiple mechanisms to characterize a vehicle's motion and position to make a robust vehicle steering control mechanism.

It is known in the art that by using a GNSS satellite's carrier phase, and possibly carrier phases from other satellites, such as WAAS satellites, a position may readily be determined to within millimeters. When accomplished with two antennas at a fixed spacing, an angular rotation may be computed using the position differences. In an exemplary embodiment, two antennas placed in the horizontal plane may be employed to compute a heading (rotation about a vertical Z axis) from a position displacement. It will be appreciated that an exemplary embodiment may be utilized to compute not only heading, but either roll (rotation about a longitudinal Y axis) or pitch (rotation about a lateral X axis) depending on the orientation of the antennas relative to the vehicle. Heading information, combined with position, either differentially corrected (DGPS or DGNSS) or carrier phase corrected real time kinematic (RTK) provides the feedback information desired for a proper control of the vehicle direction. Addition of one or more rate gyros further provides independent measurements of the vehicle's dynamics and facilitates vehicle steering control. The combination of GNSS attitude obtained from multiple antennas with gyroscopes facilitates calibration of gyroscope scale factor and bias errors which are present in low cost gyroscopes. When these errors are removed, gyro rates are more accurate and provide better inputs for guidance and control. Furthermore, gyroscopes can now effectively be integrated to obtain roll, pitch and heading angles with occasional adjustment from the GNSS-derived attitude.

Existing systems for vehicle guidance may employ separate gyros, and separate GNSS positioning or attitude systems. However, such systems do not provide an integrated heading sensor based on GNSS as disclosed herein. Moreover, separate systems exhibit the limitations of their respective technologies as mentioned earlier. The exemplary embodiments as described herein eliminate the requirements of existing systems for other means to correct for vehicle roll. Moreover, an implementation of an exemplary embodiment also provides a relatively precise, in both the sort-term and the long-term, means of calculating heading and heading rate of change (turn rate).

Another benefit achieved by incorporating a GNSS-based heading sensor is the elimination or reduction of drift and biases resultant from a gyro-only or other inertial sensor approach. Yet another advantage is that heading may be computed while the vehicle is stopped or moving slowly, which is not possible in a single-antenna GNSS based approach that requires a vehicle velocity vector to derive heading. This can be very important in applications where a vehicle has to turn slowly to align with another path. During these slow turns the gyro can drift away but by adding the use of a dual antenna GNSS solution the orientation of the gyro can be continuously corrected. This also permits immediate operation of a slow moving vehicle after being at rest, rather than requiring an initialization from motion. Yet another advantage of an exemplary embodiment is that a combination of the aforementioned sensors provides sufficient information for a feedback control system to be developed, which is standalone and independent of a vehicle's sensors or additional external sensors. Thus, such a system is readily maintained as vehicle-independent and may be moved from one vehicle to another with minimal effort. Yet another exemplary embodiment of the sensor employs global navigation satellite system (GNSS) sensors and measurements to provide accurate, reliable positioning information. GNSS sensors include, but are not limited to GNSS, Global Navigation System (GLONAS), Wide Area Augmentation System (WAAS) and the like, as well as combinations including at least one of the foregoing.

An example of a GNSS is the Global Positioning System (GPS) established by the United States government that employs a constellation of 24 or more satellites in well-defined orbits at an altitude of approximately 26,500 km, These satellites continually transmit microwave L-band radio signals in two frequency bands, centered at 1575.42 MHz and 1227.6 MHz., denoted as L1 and L2 respectively. These signals include timing patterns relative to the satellite's onboard precision clock (which is kept synchronized by a ground station) as well as a navigation message giving the precise orbital positions of the satellites, an ionosphere model and other useful information. GNSS receivers process the radio signals, computing ranges to the GNSS satellites, and by triangulating these ranges, the GNSS receiver determines its position and its internal clock error.

In standalone GNSS systems that determine a receiver's antenna position coordinates without reference to a nearby reference receiver, the process of position determination is subject to errors from a number of sources. These include errors in the GNSS satellite's clock reference, the location of the orbiting satellite, ionosphere induced propagation delay errors, and troposphere refraction errors.

To overcome the errors of the standalone GNSS system, many positioning applications have made use of data from multiple GNSS receivers. Typically, in such applications, a reference receiver, located at a reference site having known coordinates, receives the GNSS satellite signals simultaneously with the receipt of signals by a remote receiver. Depending on the separation distance between the two GNSS receivers, many of the errors mentioned above will affect the satellite signals equally for the two receivers. By taking the difference between signals received both at the reference site and the remote location, the errors are effectively eliminated. This facilitates an accurate determination of the remote receiver's coordinates relative to the reference receiver's coordinates.

The technique of differencing signals from two or more GNSS receivers to improve accuracy is known as differential GNSS (DGNSS or DGPS). Differential GNSS is well known and exhibits many forms. In all forms of DGNSS, the positions obtained by the end user's remote receiver are relative to the position(s) of the reference receiver(s). GNSS applications have been improved and enhanced by employing a broader array of satellites such as GNSS and WAAS. For example, see commonly assigned U.S. Pat. No. 6,469,663 B1 to Whitehead et al. titled Method and System for GNSS and WAAS Carrier Phase Measurements for Relative Positioning, dated Oct. 22, 2002, the disclosures of which are incorporated by reference herein in their entirety. Additionally, multiple receiver DGNSS has been enhanced by utilizing a single receiver to perform differential corrections. For example, see commonly assigned U.S. Pat. No. 6,397,147 B1 to Whitehead titled Relative GNSS Positioning Using a Single GNSS Receiver with Internally Generated Differential Correction Terms, dated May 28, 2002, the disclosures of which are incorporated by reference herein in their entirety.

II. GNSS and Gyro Control System and Method

Figure 2:
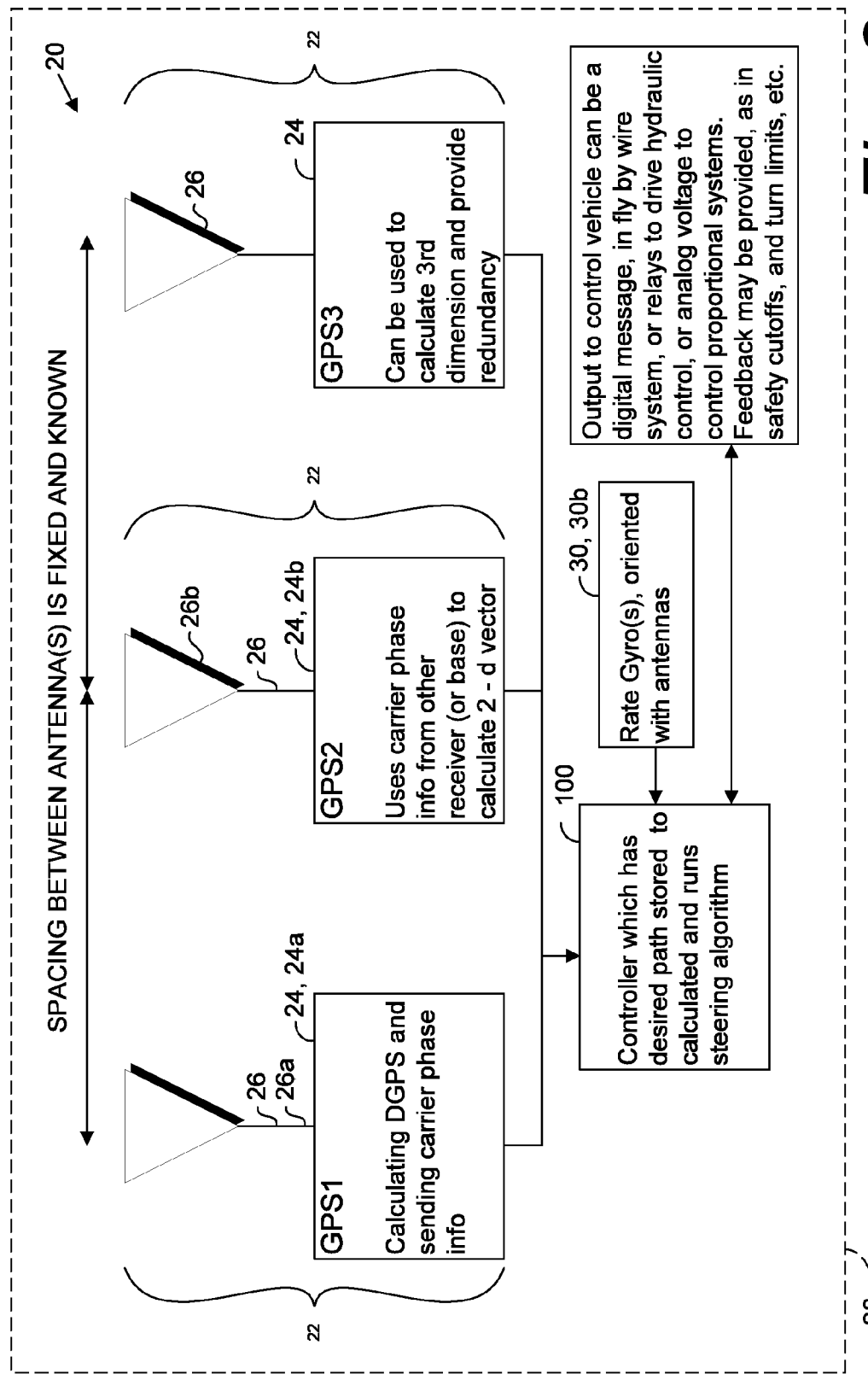
FIG. 2 depicts an illustrative block diagram of the vehicle including an exemplary embodiment of a sensor system.
Figure 3:
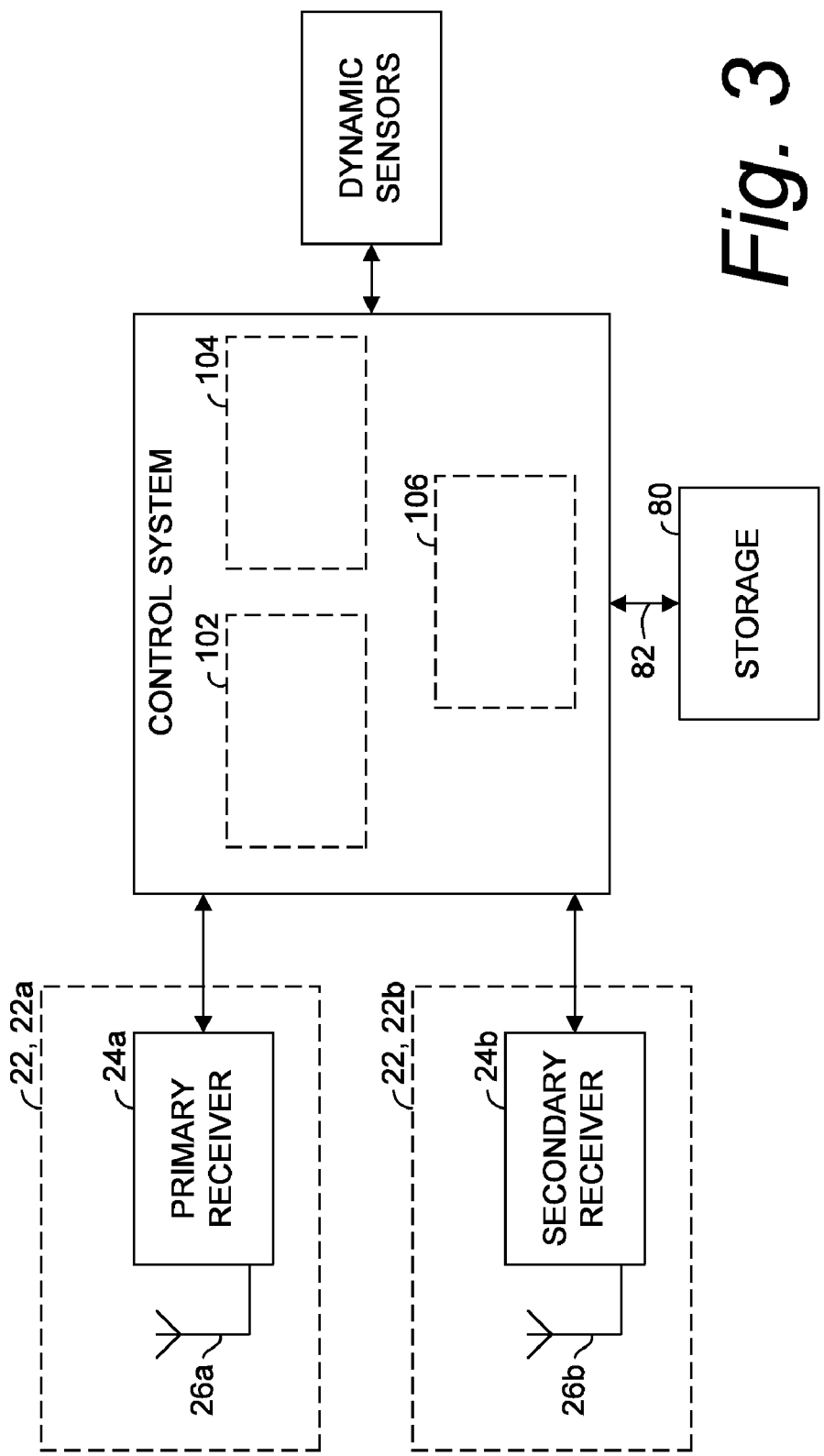
FIG. 3 depicts an illustrative block diagram of a sensor system in accordance with an exemplary embodiment.

Referring now to FIGS. 1 through 4, an illustrative vehicle 10 is depicted including a sensor system 20 in accordance with an exemplary embodiment. Referring also to FIGS. 2 and 3, block diagrams of the sensor system 20 are depicted. The sensor system 20 includes, but is not limited to a GNSS attitude system 22, comprising at least a GNSS receiver 24 and an antenna 26. The GNSS receiver/antenna systems comprising GNSS attitude system 22 cooperate as a primary receiver system 22a and a secondary receiver system 22b, with their respective antennas 26a and 26b mounted with a known separation. The primary receiver system 22a may also be denoted as a reference or master receiver system, while the secondary receiver system 22b may also be denoted as a remote or slave receiver system. It will also be appreciated that the selection of one receiver as primary versus secondary need not be of significance; it merely provides a means for distinguishing between systems, partitioning of functionality, and defining measurement references to facilitate description. It should be appreciated that the nomenclature could readily be transposed or modified without impacting the scope of the disclosure or the claims.

The sensor system 20 is optionally configured to be mounted within a single enclosure 28 to facilitate transportability. In an exemplary embodiment, the enclosure 28 can be any rigid assembly, fixture, or structure that causes the antennas 26 to be maintained in a substantially fixed relative position with respect to one another. In an exemplary embodiment, the enclosure 28 may be a lightweight bracket or structure to facilitate mounting of other components and transportability. Although the enclosure 28 that constrains the relative location of the two antennas 26a and 26b may have virtually any position and orientation in space, the two respective receivers 24 (reference receiver 24a and remote receiver 24b) are configured to facilitate communication with one another and resolve the attitude information from the phase center of the reference antenna 26a to the phase center of the remote antenna 26b with a high degree of accuracy.

Yet another embodiment employs a GNSS sensor 20 in the embodiments above augmented with supplementary inertial sensors 30 such as accelerometers, gyroscopes, or an attitude heading reference system. More particularly, in an implementation of an exemplary embodiment, one or more rate gyro(s) are integrated with the GNSS sensor 20.

In yet another exemplary embodiment, a gyro that measures roll-rate may also be combined with this system's GNSS-based roll determination. A roll rate gyro denoted 30b would provide improved short-term dynamic rate information to gain additional improvements when computing the sway of the vehicle 10, particularly when traveling over uneven terrain.

It will be appreciated that to supplement the embodiments disclosed herein, the data used by each GNSS receiver 24 may be coupled with data from supplementary sensors 50, including, but not limited to, accelerometers, gyroscopic sensors, compasses, magnetic sensors, inclinometers, and the like, as well as combinations including at least one of the foregoing. Coupling GNSS data with measurement information from supplementary sensors 30, and/or correction data for differential correction improves positioning accuracy, improves initialization durations and enhances the ability to recover for data outages. Moreover, such coupling may further improve, e.g., reduce, the length of time required to solve for accurate attitude data.

It will be appreciated that although not a requirement, the location of the reference antenna 26a can be considered a fixed distance from the remote antenna 26b. This constraint may be applied to the azimuth determination processes in order to reduce the time required to solve for accurate azimuth, even though both antennas 26a and 26b may be moving in space or not at a known location. The technique of resolving the attitude information and position information for the vehicle 10 may employ carrier phase DGNSS techniques with a moving reference station. Additionally, the use of data from auxiliary dynamic sensors aids the development of a heading solution by applying other constraints, including a rough indication of antenna orientation relative to the Earth's gravity field and/or alignment to the Earth's magnetic field.

Producing an accurate attitude from the use of two or more GNSS receiver and antenna systems 22 has been established in the art and therefore will not be expounded upon herein. The processing is utilized herein as part of the process required to implement an exemplary embodiment.

Figure 4:
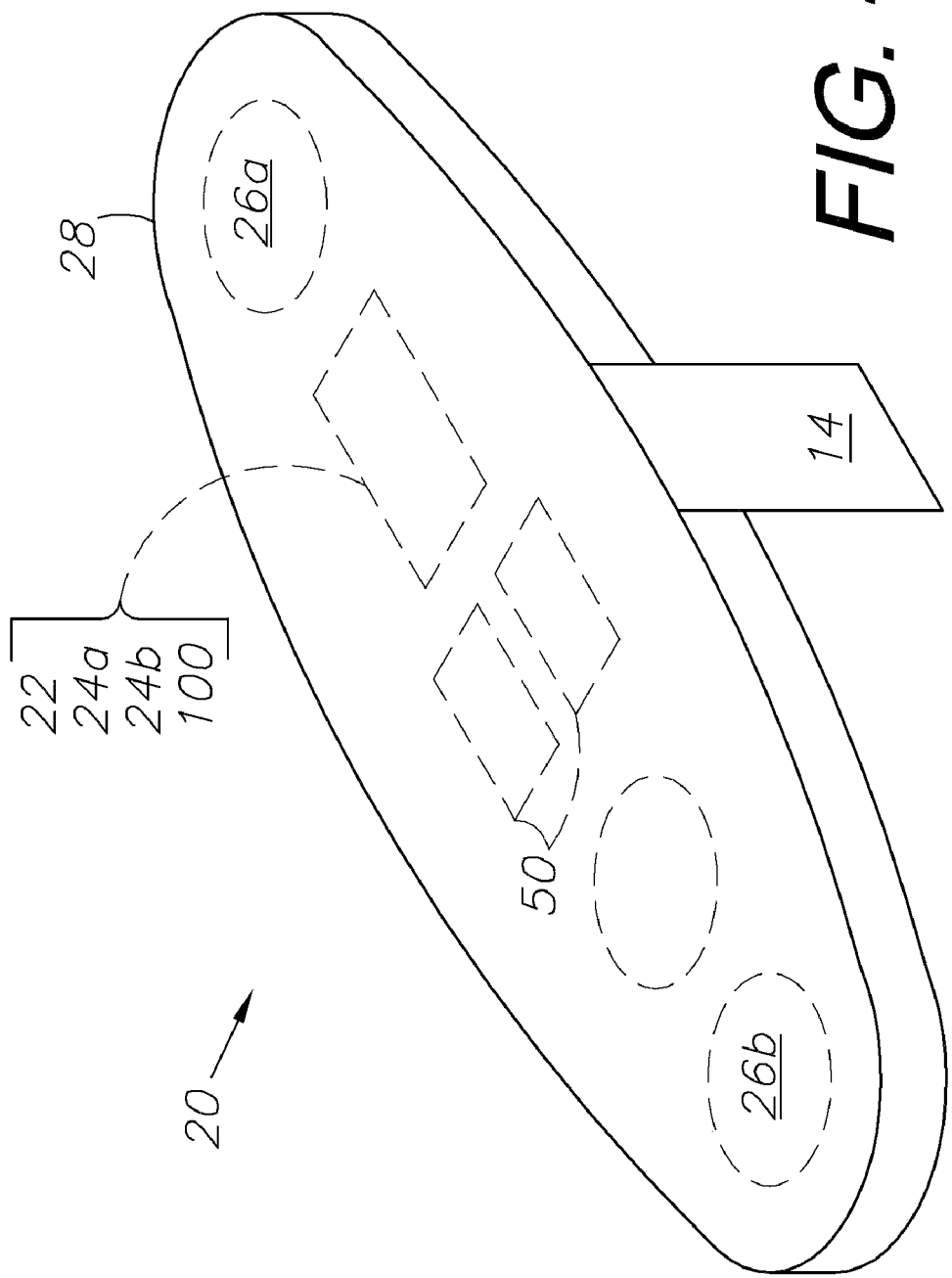
FIG. 4 depicts an illustrative sensor system in accordance with an exemplary embodiment.

Referring also to FIG. 4, a mechanism for ensuring an accurate orientation of the sensor system 20 to the vehicle 10 may be provided for by an optional mounting base 14 accurately attached to the enclosure 28. An accurate installation ensures that substantially no misalignment error is present that may otherwise cause the sensor system 20 to provide erroneous heading information. The mounting base 14 is configured such that it fits securely with a determinable orientation relative to the vehicle 10. In an exemplary embodiment, for example, the mounting base 14 is configured to fit flatly against the top surfaces of the vehicle 10 to facilitate an unimpeded view to the GNSS satellites.

With the sensor system 20 affixed and secured in the vehicle 10 power up and initialization of the sensor system 20 is thereafter executed. Such an initialization may include, but not be limited to, using the control system 100 to perform any initialization or configuration that may be necessary for a particular installation, including the configuration of an internal log file within the memory of the sensor system 20.

The sensor system 20 may further include additional associated electronics and hardware. For example, the sensor system 20 may also include a power source 32, e.g., battery, or other power generation means, e.g., photovoltaic cells, and ultrahigh capacity capacitors and the like. Moreover, the sensor system 20 may further include a control system 100. The control system 100 may include, without limitation, a controller/computer 102, a display 104 and an input device 106, such as a keypad or keyboard for operation of the control system 100. The controller 102 may include, without limitation, a computer or processor, logic, memory, storage, registers, timing, interrupts, input/output signal interfaces, and communication interfaces as required to perform the processing and operations prescribed herein. The controller preferably receives inputs from various systems and sensor elements of the sensor system 20 (GNSS, inertial, etc.), and generates output signals to control the same and direct the vehicle 10. For example, the controller 102 may receive such inputs as the GNSS satellite and receiver data and status, inertial system data, and the like from various sensors. In an exemplary embodiment, the control system 100 computes and outputs a cross-track and/or a direction error relating to the current orientation, attitude, and velocity of the vehicle 10 as well as computing a desired swath on the ground. The control system 100 will also allow the operator to configure the various settings of the sensor system 20 and monitor GNSS signal reception and any other sensors of the sensor system 20. In an exemplary embodiment, the sensor system 20 is self-contained. The control system 100, electronics, receivers 24, antennas 26, and any other sensors, including an optional power source, are contained within the enclosure 12 to facilitate ease of manipulation, transportability, and operation.

Figure 5:
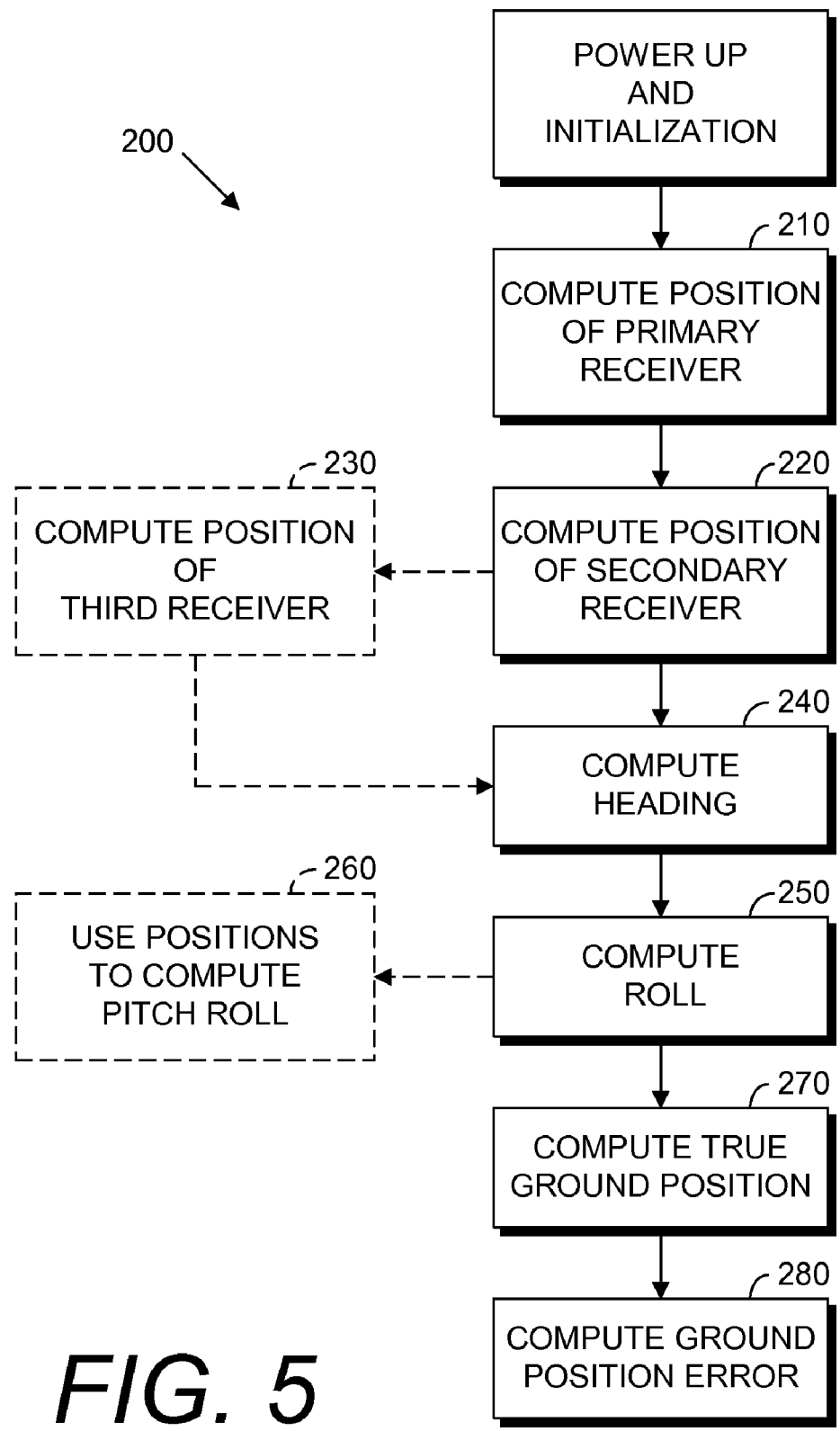
FIG. 5 depicts an illustrative flow chart of an exemplary process for determining a steering command for a vehicle in accordance with an exemplary embodiment.

Referring now to FIG. 5, a flowchart diagrammatically depicting an exemplary methodology for executing a control process 200 is provided. An exemplary control process 200, such as may be executed by an operator in conjunction with a control system 100, acts upon information from the sensor system 20 to output cross-track and/or direction error based upon corrected 3-D position, velocity, heading, tilt, heading rate (degrees per second), radius of curvature and the like.

System 22a computes its position, denoted $p_1$ ($x_1$, $y_1$, $z_1$). Referring now to block 220, the secondary receiver and antenna system 22b computes its position, denoted $p_2$ ($x_2$, $y_2$, $z_2$). Referring now to block 230, optionally additional receiver and antenna system(s) 22 compute their respective positions, denoted $p_3 (x_3, y_3, z_3), \ldots p_n (x_n, y_n, z_n)$.

At process block 240, employing a geometric calculation the heading is computed as the vector perpendicular to the vector joining the two positions, in the horizontal plane (assuming they are aligned with the vehicle 10). Furthermore, at block 250 the roll of the vehicle 10 may readily be computed as the arc-tangent of the ratio of the difference in heights of the two antennas 26a and 26b divided by the spacing between their phase centers (a selected distance within the enclosure 12). It will be appreciated that optionally, if additional receiver and antenna systems are utilized and configured for additional measurements, the pitch and roll angles may also be computed using differential positioning similar to the manner for computing heading. Therefore, in FIG. 5, optionally at process block 260, the pitch and roll may be computed.

Continuing with FIG. 5, at process block 270, using the computed roll angle and a known antenna height (based on the installation in a given vehicle 10), the actual position at the center of the vehicle 10 projected to the ground may be calculated. This position represents a true ground position of the vehicle 10. Once the ground position is known, the error value representing the difference between where the vehicle should be based on a computed swath or track, and where it actually is, can be readily calculated as shown at block 280.

Optionally, the vector velocities of the vehicle 10 are also known or readily computed based on an existing course and heading of the vehicle 10. These vector velocities may readily be utilized for control and instrumentation tasks.

Figure 6:
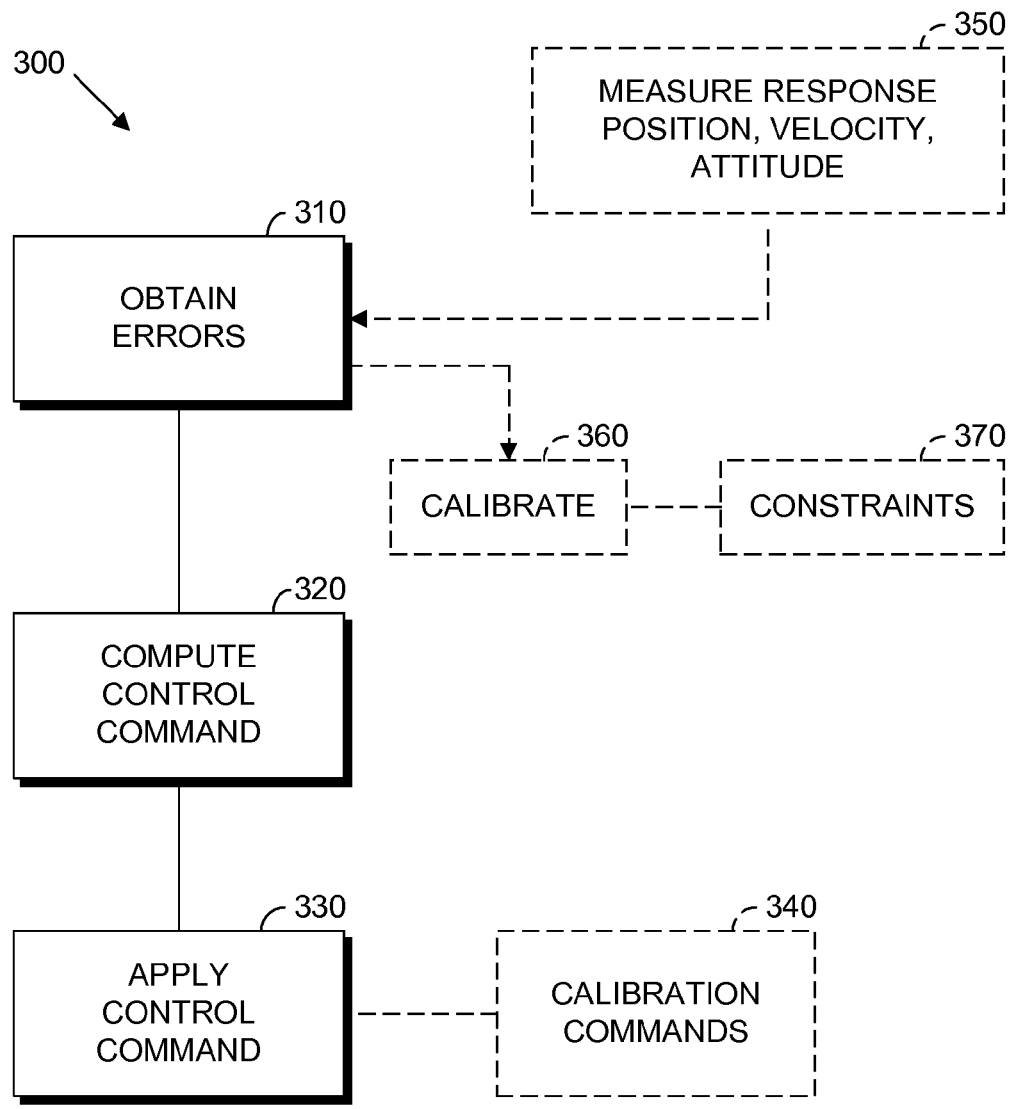
FIG. 6 depicts an illustrative flow chart of an exemplary process for determining a steering command with an exemplary sensor system in accordance with an alternative embodiment.

Turning now to FIG. 6, in another exemplary embodiment a steering control process 300 can utilize the abovementioned information from the sensor system 20 to direct the vehicle motion. At process block 310 the steering control may be initiated by obtaining the computed errors from process 200. Turning to block 320, the steering control process 300 may be facilitated by computing a steering control command based on a proportionality factor times the difference in desired position versus actual position (computed position error), plus a second proportionality factor times the difference in desired heading versus actual heading (heading error). The second proportionality factor ensures that when the vehicle attains the desired position it is actually directed to the correct heading, rather than crossing the track. Such an approach will dramatically improve steering response and stability. At process block 330, a steering command is generated and directed to the vehicle 10.

Moreover, continuing with FIG. 6, optionally a recursive adaptive algorithm may also be employed to characterize the vehicle response and selected dynamic characteristics. In an exemplary embodiment, the sensor system 20 applies selected control values to the vehicle steering control mechanism as depicted at optional block 340 and block 330. The sensor system 20 measures the response of the vehicle 10 as depicted at process block 350 and calculates the response times and characteristics for the vehicle. For example, a selected command is applied and the proportionality of the turn is measured given the selected change in steering. Turning to process block 360, the responses of the vehicle 10 are then utilized to calibrate the control commands applying a modified control command to achieve a desired response. It will be appreciated that such an auto-calibration feature would possibly be limited by constraints of the vehicle to avoid excess stress or damage as depicted at 370.

It will be appreciated that while a particular series of steps or procedures is described as part of the abovementioned alignment process, no order of steps should necessarily be inferred from the order of presentation. For example, the process 200 includes installation and power up or initialization. It should be evident that power-up and initialization could potentially be performed and executed in advance without impacting the methodology disclosed herein or the scope of the claims.

It should further be appreciated that while an exemplary partitioning functionality has been provided, it should be apparent to one skilled in the art that the partitioning could be different. For example, the control of the primary receiver 24a and the secondary receiver 24b, as well as the functions of the controller 102, could be integrated in other units. The processes for determining the alignment may, for ease of implementation, be integrated into a single receiver. Such configuration variances should be considered equivalent and within the scope of the disclosure and claims herein.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium 80 wherein the computer becomes an apparatus for practicing the invention when the computer program code is loaded into and executed by the computer. The present invention can also be embodied in the form of computer program code stored in a storage medium or loaded into and/or executed by a computer, for example. The present invention can also be embodied in the form of a data signal 82 transmitted by a modulated or unmodulated carrier wave, over a transmission medium, such as electrical wiring or cabling, through fiber optics or via electromagnetic radiation. When the computer program code is loaded into and executed by a computer, the computer becomes an apparatus for practicing the invention. When implemented on a general-purpose microprocessor, the computer program code segments configure the microprocessor to create specific logic circuits.

III. Alternative Aspect GNSS Control Systems and Methods

Figures 7A, 7B:
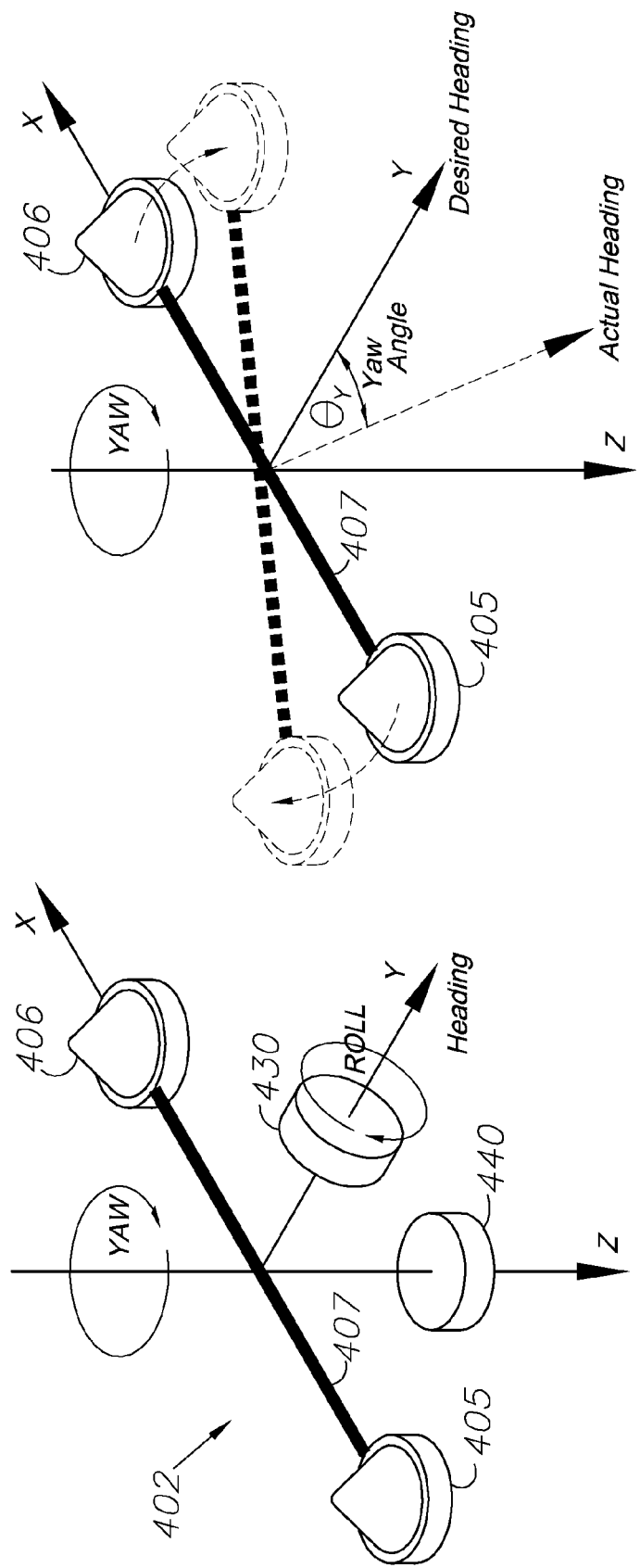
FIG. 7A depicts a multi-axis antenna and gyroscope system embodying an aspect of the present invention and including two antennas connected by a rigid link and yaw and roll gyroscopes.
FIG. 7B depicts the system in a yaw attitude.

FIG. 7A shows another alternative aspect of the invention including a GNSS antenna and gyroscope attitude system 402 with antennas 405, 406 separated by a rigid link 407. In a typical application, the rigid link 407 is attached to the vehicle 10 and extends along the X (transverse) axis or transversely with respect to the vehicle's direction of travel, which generally corresponds to the Y (heading) axis. Alternatively, the vehicle 10 itself can provide the rigid link between the antennas 405, 406, for example, by mounting the antennas 405, 406 at predetermined, fixed locations on the roof of the vehicle cab with a predetermined, fixed distance therebetween. Another alternative is to provide a GNSS attitude device with antennas, receivers and sensors (e.g., gyroscopes (gyros), accelerometers and other sensors) in a self-contained, unitary enclosure, such as the device 20 shown in enclosure 28 in FIG. 4. Regardless of the antenna-mounting structure, the orientation of the antenna pair and the rigid link 407 (or vehicle 10) is determined with respect to an Earth-fixed coordinate system. The XYZ axes shown in FIG. 7A provide an example for defining this relation. Roll and yaw gyros 430, 440 are generally aligned with the Y and Z axes respectively for detecting and measuring vehicle 10 attitude changes with respect to these axes.

With the system 402 installed on a vehicle 10 (FIG. 8), the two antennas 405, 406 can provide angular orientations with respect to two axes. In the example shown, angular orientation with respect to the Y (heading) axis corresponds to vehicle roll and with respect to the Z (vertical) axis corresponds to vehicle yaw. These orientations are commonly of interest in agricultural vehicles whereby this is the preferred mounting and orientation arrangement for such applications. The vehicle's roll most adversely affects GNSS-measured vehicle cross-track error. By measuring the vehicle's roll, such cross-track errors can be compensated for or eliminated. Such roll-induced cross-track errors include variable roll errors due to uneven terrain and constant roll errors due to hill slopes. It will be appreciated that adding a third antenna provides three-axis (XYZ) attitude solutions corresponding to pitch, roll and yaw. Of course, reorienting the two-antenna system 402 can provide other attitude solutions. For example, locating the antennas' baseline (aligned with the rigid link 407) fore-and-aft along the vehicle's Y axis will provide pitch and yaw attitudes.

FIG. 7B shows the system 402 in a yaw attitude or condition whereby the vehicle 10 has deviated from a desired heading along the Y axis to an actual heading by a yaw angle $\theta_Y$. In other words, the vehicle 10 has rotated (yawed) clockwise with respect to the Z axis. FIG. 7C shows the system 402 in a roll attitude or condition whereby the vehicle 10 has deviated from level to a tilt or roll angle of $\theta_R$. In other words, the vehicle 10 has rotated (rolled) counterclockwise with respect to the Y axis.

The system 402 includes roll and yaw gyros 430, 440 mounted and oriented for detecting vehicle rotational movement with respect to the Y and Z axes. The system 402 represents a typical strap-down implementation with the vehicle 10, antennas 405, 406 and gyros 430, 440 rigidly connected and moving together. A body-fixed coordinate system is thus defined with the three perpendicular axes XYZ.

In all but the most extreme farmlands, the vehicle 10 would normally deviate relatively little from level and horizontal, usually less than 30° in most agricultural operations. This simplifies the process of calibrating the gyros 430, 440 using the GNSS attitude system 402 consisting of two or more antennas 405, 406. For simplicity, it is assumed that the body-fixed axes XYZ remain relatively close to level. Thus, the change in the heading (yaw) angle $\theta_Y$ of FIG. 7B is approximately measured by the body-fixed yaw gyro 440, even though there may be some small discrepancy between the axes of rotation. Similar assumptions can be made for the roll angle $\theta_R$ (FIG. 7C), which is approximately measured by the body-fixed roll gyro 430. A similar assumption could be used for measuring pitch attitude or orientation angles with a pitch gyro.

This simplifying assumption allows the gyros to be decoupled from one another during integration and avoids the necessity of using a full strap-down quaternion implementation. For example, heading deviation is assigned only to the yaw gyro 440 (gyro axis perturbations from the assumed level axis alignment are ignored). Similarly, vehicle roll is assumed to be measured completely by a single roll gyro 430. GNSS attitude-measured heading and roll can then be used to calibrate the gyros 430, 440. Such simplifying assumptions tend to be relatively effective, particularly for agricultural operations on relatively flat, level terrain. Alternatively, a full six-degrees-of-freedom strap-down gyro implementation with quaternion integration could be employed, but such a solution would normally be excessive and represent an ineffective use of computing resources, unless an inertial navigation system (INS) was also being used to backup GNSS, for example, in the event of GNSS signal loss.

For the purpose of calibrating the gyroscopes 430, 440, the angles measured by the GNSS attitude system 402 are used as truth in a Kalman filter estimator of gyro bias and scale factor errors. Over a small interval of time, T, the following equation holds:

$$\vec{\theta}_{gyro}T = A\theta_{true} + BT$$

Where
$\vec{\theta}_{gyro}$ = average gyro reading over $$T = 1/n \sum_n \dot{\theta}_{gyro}$$

(with n readings taken over time T)
$\theta_{true}$ = truth angular change over interval T as measured by the GNSS attitude system.
A = gyro scale factor error
B = gyro rate bias error A two state Kalman filter is defined to have the gyro rate basis and scale factor error as states. The Kalman process model is a first-order Markov:

$$X_{k+1} = \begin{bmatrix} 1 & 0 \\ 0 & 1 \end{bmatrix} X_k + \begin{bmatrix} \sigma_A & 0 \\ 0 & \sigma_B \end{bmatrix} W_k$$

where the state vector X=[A B]
Here $\sigma_A$ and $\sigma_B$ are noise amplitudes and W is white noise. This dictates what is known as a random walk of the state [A B]. The designer of the Kalman filter chooses $\sigma_A$ and $\sigma_B$ according to how rapidly the bias and scale factor errors are expected to vary (usually variations due to temperature dependencies of scale and bias in a low cost gyro). Typical variations, especially of the scale factor, are quite small (A and B are nearly constant), and $\sigma_A$ and $\sigma_B$ are chosen accordingly. Typical values for a low-cost gyroscope, using a time interval T are:

$$\sigma_A = \frac{0.02T}{1200}, \quad \sigma_B = \frac{T}{1200}$$

where T is expressed in seconds and 1200 means 1200 seconds. For example, here the random walk is chosen to cause a drift in scale factor of 0.02 in 1200 seconds. The Kalman measurement equation is:

$$y = Hx + v$$

Where
$y = \vec{\theta}_{gyro}T$, $H = [\theta_{true} \ T]$ and v is measurement noise. The Kalman covariance propagation and gain calculation is designed according to well-known techniques.

Similar Kalman filters are deployed in both yaw and roll (and/or pitch) channels. The GNSS attitude devices 20 provides a reference yaw and roll that act as the Kalman measurements enabling the calibration of gyro rate basis and scale factor errors. The GNSS device provides heading and roll, even when the vehicle is stationary or traveling in reverse. This provides a significant advantage over single-antenna systems which provide a vehicle direction only when moving (i.e., a velocity vector). The multi-antenna attitude device 20 enables continuous calibration regardless of whether or not and in what direction the vehicle 10 is moving.

The calibrated gyros 430, 440 are highly advantageous in a vehicle steering control system. High precision heading and heading-rate produced by the calibrated yaw gyro is a very accurate and instantaneous feedback to the control of vehicle changes in direction. The angular rate produced by the gyro is at least an order of magnitude more accurate than the angular rate produced by pure GNSS systems, even those with multiple antennas. The system 402 is also very responsive. The feedback control needs such relatively high accuracy and responsiveness in heading and heading-rate to maintain control loop stability. It is well known that rate feedback in a control loop enhances stability. On a farm vehicle, where vehicle dynamics may not be fully known or modeled, this aspect is particularly important. The rate term allows a generic control system to be developed which is fairly insensitive to un-modeled vehicle dynamics. A relatively accurate heading and heading-rate-of-turn can be calculated for use in a vehicle automatic steering system.

Another advantage of the system 402 is that a gyro calibrated to measure tilt angle can provide the vehicle's tilt much more accurately than a system relying exclusively on GNSS positioning signals. This advantage is particularly important in high-precision autosteering, e.g., to the centimeter level. Errors in GNSS attitude are effectively increased by the ratio of the antenna spacing to the mounted height of the antennas above the ground, as illustrated in FIG. 8, which shows an attitude system 402 comprising a pair of antennas 405, 406 connected by a link 407, as described above. The system 402 is shown tilted through a tilt (roll) angle $\theta_R$. An imaginary antenna height line perpendicular to the rigid link 407 is projected to the "true" ground position of the vehicle 10 in FIG. 8 and forms the roll angle with respect to the Z axis. The relative antenna height differential can be projected along the vertical Z axis to a ground intercept point and establishes a cross-track error (distance between the vehicle true ground position and the Z axis ground intercept point), whereby errors in the antenna height differential are amplified by the ratio of the rigid link 407 length to the antenna height. The spacing of the antennas 405, 406, which corresponds to the length of the rigid link 407, is typically limited by the width of the vehicle 10, which can be relatively tall, thereby resulting in a relatively large antenna height-to-spacing ratio, e.g., five-to-one. Furthermore, noise-induced errors present in GNSS relative antenna height differentials (e.g., carrier phase noise, etc.) will be multiplied by this ratio, which can cause steering errors, including steering oscillations, etc.

The GNSS attitude system 402 utilizes a roll gyro (e.g., 430) for measuring rate-of-change of the roll angle, rather than the absolute roll angle, which rate of change is integrated to compute absolute roll angle. The constant of integration can be initialized to the current GNSS-derived roll angle and then subsequently steered to the GNSS roll angle by filtering with a Hatch filter or similar filter used for smoothing the code phase against the carrier phase in the GNSS receivers. Relatively smooth vehicle roll estimates can thus be achieved with a gyro.

More specifically, in an exemplary embodiment, the filtering is supplemented by the equation:

$$\theta_{filter}(k) = \Delta_{gyro}(k) + \text{Gain}*[\theta_{GNSS}(k) - \theta_{filter}(k-1) - \Delta_{gyro}(k)]$$

$$\Delta_{gyro}(k) = \theta_{gyro}(k) - \theta_{gyro}(k-1)$$

Where $\theta_{filter}(k)$ is the desired output roll angle (at time k) smoothed by gyro roll angle, but steered to GNSS roll angle. The GNSS roll (at time k) is $\theta_{GNSS}(k)$ while the raw gyro angular reading is $\theta_{gyro}(k)$ which is obtained by integrating gyro angular rate. The difference in gyro integrated rate over one time interval (k−1 to k) is denoted $\Delta_{gyro}(k)$. The filter bandwidth and weighting of the GNSS roll angle into the solution is set by the filter's gain (denoted Gain). One method to choose the gain is to assign Gain=T/τ where T is the time span from epoch to epoch and τ is a time-constant, typically much larger than T. The smaller the Gain, the less the GNSS roll angle is weighted into the solution. The gain is chosen to give a smooth filtered roll output, dominated by the low gyro noise characteristics, but also maintaining alignment with GNSS roll. Since the gyro is calibrated in terms of its scale and bias errors per the methods described earlier, the gain can be chosen to be very small (much less than 1) and still the filtered roll angle closely follows the GNSS roll angle, but without the noise of the GNSS derived roll angle. Similar schemes can be deployed for pitch and heading angles if needed, all with the benefit of improved steering if such angles are used in the steering control feedback.

Figure 9:
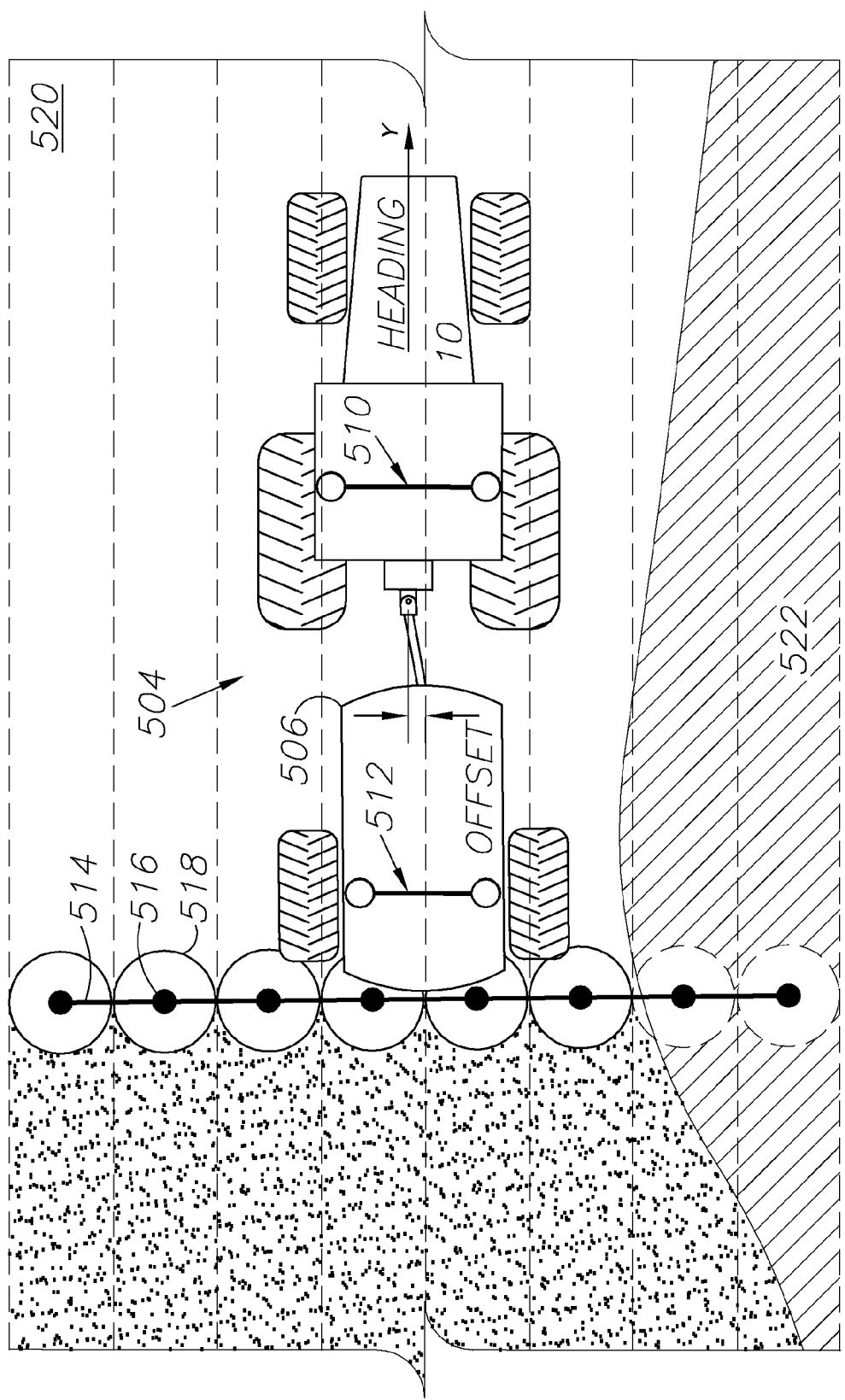
FIG. 9 depicts an alternative aspect of the system with antenna and gyroscope subsystems mounted on both the vehicle and the implement, e.g. a sprayer with selectively controllable spray nozzles.

FIG. 9 shows a GNSS and gyroscopic control system 502 comprising an alternative aspect of the present invention in a tractor and sprayer agricultural equipment application 504. The vehicle (e.g., a motive component or tractor) 10 is connected to a working component (e.g., a sprayer) 506 by an articulated connection 508, which can comprise a conventional tongue-and-hitch connection, or a powered, implement steering system or hitch, such as those shown in U.S. Pat. No. 6,865,465, No. 7,162,348 and No. 7,373,231, which are assigned to a common assignee herewith and are incorporated herein by reference.

The tractor 10 and the sprayer 506 mount tractor and sprayer GNSS antenna and gyroscope attitude subsystems 510, 512 respectively, which are similar to the system 402 described above and provide GNSS-derived position and attitude outputs, supplemented by gyro-derived rate of rotation outputs for integration by the control system 502. The sprayer 506 includes a spray boom 514 with multiple nozzles 516 providing spray patterns 518 as shown, which effectively cover a swath 520. The system 502 can be programmed for selectively controlling the nozzles 516. For example, a no-spray area 522 is shown in FIG. 9 and can comprise, for example, an area previously sprayed or an area requiring spray. Based on the location of the no-spray area 522 in relation to the spray boom 514, one or more of the nozzles 516 can be selectively turned on/off. Alternatively, selective controls can be provided for other equipment, such as agricultural planters wherein the seed boxes can be selectively turned on/off.

Figure 10:
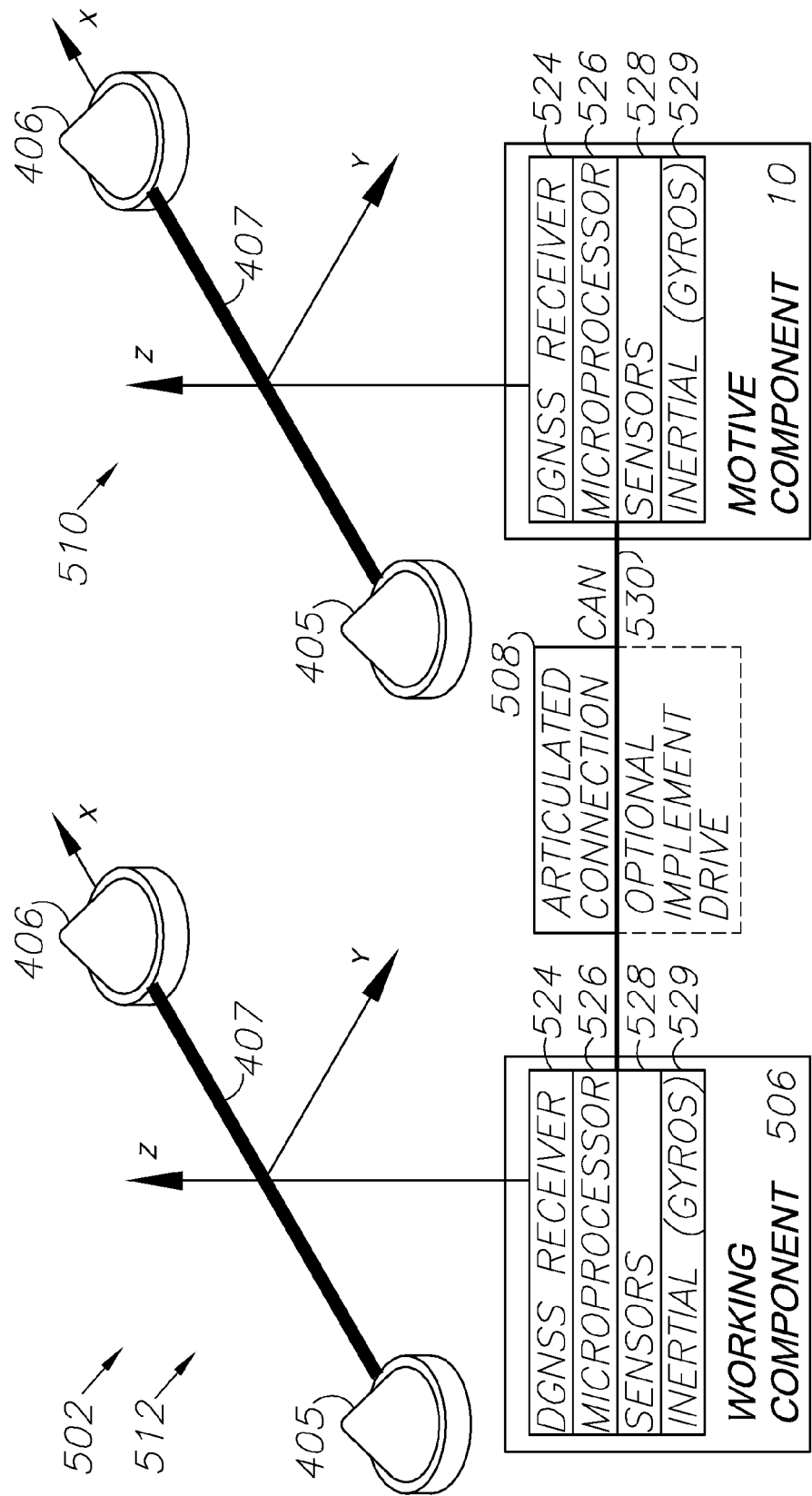
FIG. 10 depicts a block diagram of the system shown in FIG. 9.

FIG. 10 shows some of the major components of the system 502, including the GNSS antenna and gyroscope attitude subsystems 510, 512 with antennas 405, 406 separated by rigid links 407, as described above, and inertial gyros 514. The tractor and implement 10, 506 can be equipped with comparable systems including DGNSS receivers 524, suitable microprocessors 526 and the inertial gyros 529. Additional sensors 528 can include wheel counters, wheel turn sensors, accelerometers, etc. The system components can be interconnected by a CAN connection 530. Alternatively, components can be wirelessly interconnected, e.g., with RF transmitters and receivers.

In operation, the functions described above can be implemented with the system 502, which has the additional advantage of providing GNSS and gyro-derived positioning and attitude signals independently from the tractor 10 and the implement 506. Such signals can be integrated by one or both of the microprocessors 526. The tractor 10 can be automatically steered accordingly whereby the implement 506 is maintained on course, with the additional feature of selective, automatic control of the nozzles 516. For example, FIG. 9 shows the course of the tractor 10 slightly offset to the course of the sprayer 516, which condition could be caused by a downward left-to-right field slope. Such sloping field conditions generate roll attitudes, which could also be compensated for as described above. For example, the system 502 can adjust the output from the spray nozzles 516 to compensate for such variable operating conditions as sloping terrain, turning rates, tire slippage, system responsiveness and field irregularities whereby the material is uniformly applied to the entire surface area of the field. Moreover, the GNSS-derived positioning and heading information can be compared to actual positioning and heading information derived from other sensors, including gyros, for further calibration.

IV. Multi-Antenna High Dynamic Roll Compensation and Rover L1 RTK

Figure 11:
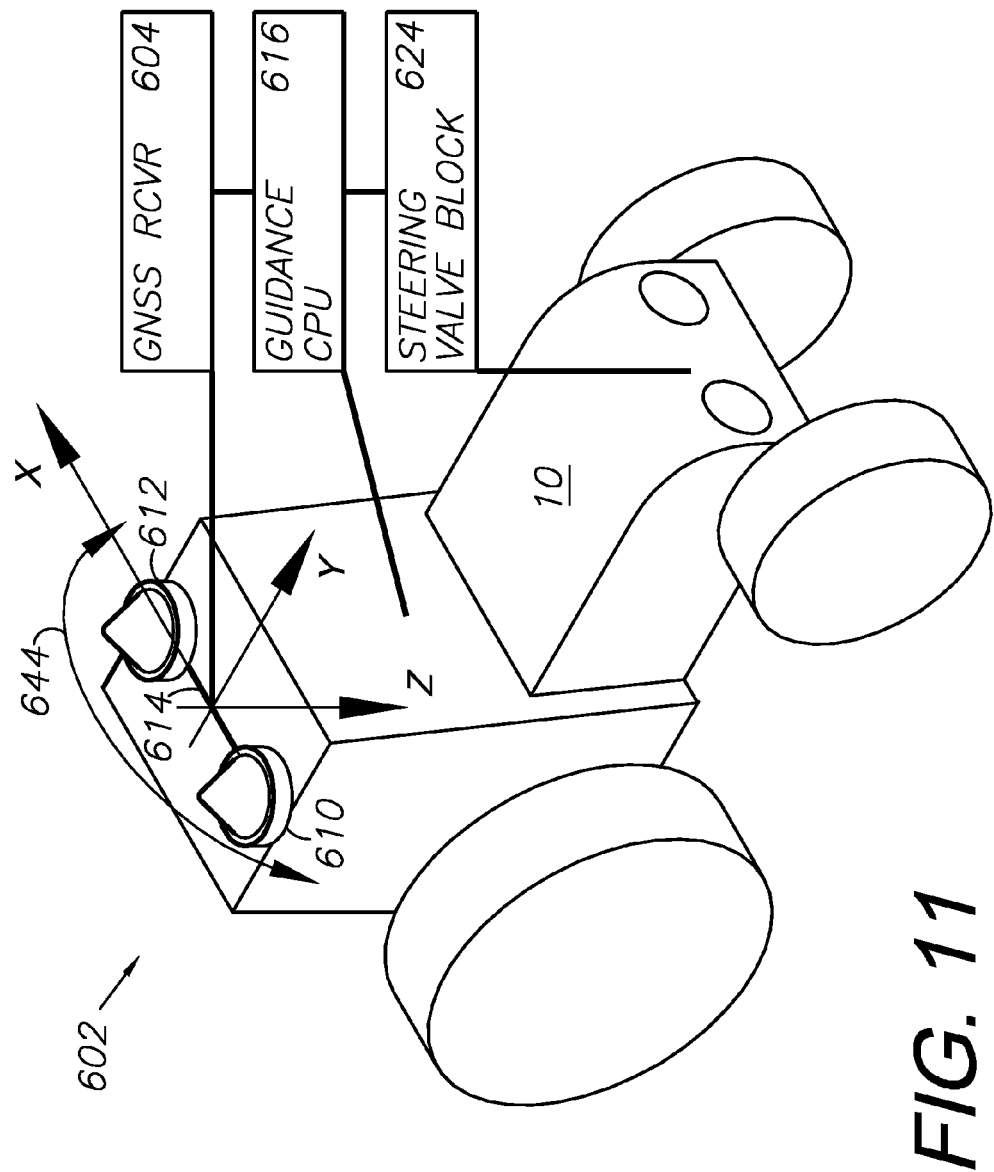
FIG. 11 depicts a high dynamic roll compensation GNSS guidance system comprising an alternative aspect of the present invention.
Figure 12:
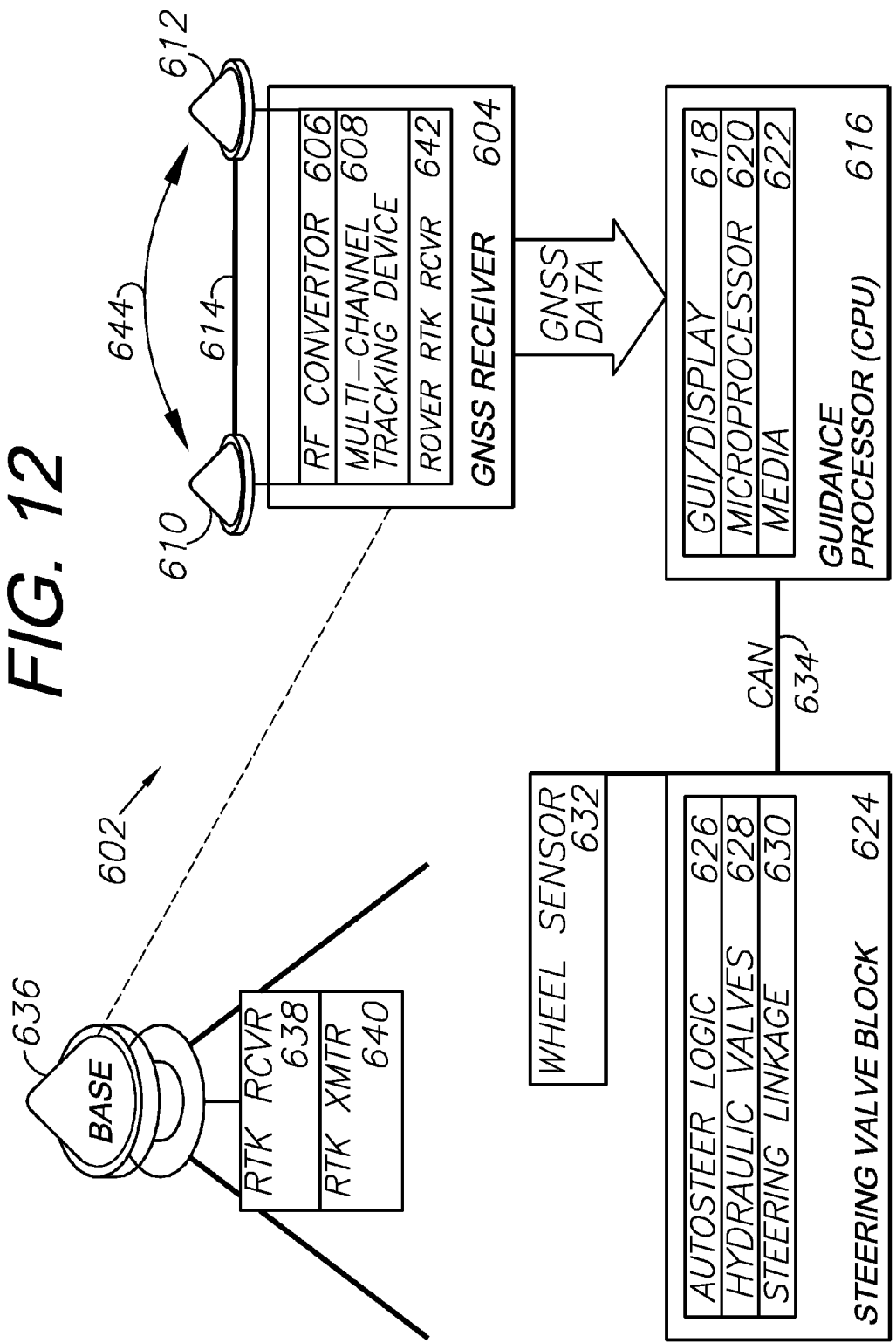
FIG. 12 depicts a block diagram of the system shown in FIG. 11.

Another alternative aspect GNSS guidance system 602 is shown in FIGS. 11 and 12 and provides high dynamic roll compensation, heading and rate-of-turn (ROT) in an RTK system including a GNSS receiver 604 including an RF converter 606 connected to a multi-channel tracking device 608 and first and second antennas 610, 612, which can be mounted on top of a vehicle 10 in fixed relation defining a tranverse (X axis) fixed baseline 614. The receiver 604 provides a GNSS data output to a guidance processor (CPU) 616, which includes a GUI/display 618, a microprocessor 620 and media (e.g., for data storage) 622. A steering valve block 624 includes autosteer logic 626, hydraulic valves 628 and steering linkage 630. A wheel sensor 632 is connected to the steering valve block 624, which in turn is connected to the guidance processor 616 by a suitable CAN bus 634.

GNSS positioning signals are received from a constellation of GNSS satellites and an RTK base transceiver 636, which includes a receiver 638 and a transmitter 640 for transmitting carrier phase signals to a rover RTK receiver 642. By using GNSS positioning signals from the satellites and correctional signals from the RTK base transceiver 636, the guidance system 602 can calculate a relatively accurate position relative to the base transceiver 636, which can be located at a predetermined position, such as a benchmark. The guidance system 602 described thus far is an RTK system utilizing a dual frequency receiver and is capable of achieving sub-centimeter accuracy using the carrier phase signals.

Roll compensation, heading and rate of turn can all be calculated using vector-based heading (yaw and roll) information derived from the rover GNSS receiver 604. High-dynamic vehicle roll is a problem with certain applications, such as agricultural vehicles, which traverse uneven terrain and tend to be relatively tall with antennas mounted three meters or more above ground level. Antenna arrays can swing significant distances from side to side with vehicle roll, as indicated by a roll arrow 644. Such deviations can be detrimental to precision farming, and require compensation. The fixed-baseline vehicle antennas 610, 612 provide the necessary dynamic vector outputs for processing and compensation by the steering valve block 624. For example, the microprocessor 620 can be preprogrammed to instantly respond to such roll errors by providing counteracting output signals via the CAN bus 634 to autosteer logic 626, which controls the hydraulic valves 628 of the steering valve block 624. A slight delay phase shift can be programmed into the microprocessor 620, thus reflecting the inherent lag between vehicle roll and the steering system reaction. The delay phase shift can be adjustable and calibrated for accommodating different equipment configurations. The GNSS receiver 604 output provides relatively accurate guidance at slow speeds, through turns and in reverse without relying on sensing vehicle motion via an inertial navigation system (INS), utilizing gyroscopes and/or accelerometers. Moreover, the guidance system 602 can eliminate the calibration procedures normally needed for INS-corrected systems.

The system 602 can likewise provide high dynamic yaw compensation for oscillation about the vertical Z axis using the two-antenna fixed baseline configuration of the receiver 604. Adding a third antenna would enable high dynamic compensation with respect to all three axes XYZ e.g., in a six-degrees-of-freedom mode of operation.

Providing multiple antennas 610, 612 on a rover vehicle 10 can significantly improve the ability to resolve integer ambiguities by first obtaining an attitude solution by solving for the locations of the rover antennas 610, 612 with respect each other. Then, using the non-relative locations and the known relative ambiguities, solving for the global ambiguities using observations taken at each antenna 610, 612. The number of observations is thus significantly increased over conventional RTK. Solving the global ambiguities enables locating the rover antennas 610, 612 in a global sense relative to a base station 636. Using multiple antennas in this manner enables using L1 single frequency receivers, which tend to be less expensive than dual frequency (L1 and L2) receivers, as in conventional RTK systems. An exemplary method consists of:

1. Transmitting code and carrier phase data from a base station 636 to a multiple antenna rover system (e.g., 602).
2. At the rover 602 side, determining the relative locations and the relative ambiguities of the multiple antennas using an attitude solution taking advantage of known geometry constraints and/or a common clock. Such a method is disclosed in U.S. Pat. No. 7,388,539, which is assigned to a common assignee herewith and is incorporated herein by reference.
3. Optionally store off the attitude solution (locations and ambiguities) for later time-tag matching with the data from the base station 636. Optionally, also store off the current GNSS observations (carrier phase) for the same purpose. Although this step is not necessary, time tag matching of base and rover data improves results by avoiding extrapolation errors.
4. Form single or double difference equations and solve for the global ambiguities using knowledge of the relative antenna locations and/or common clocks and/or the relative ambiguities.

Example using a two-antenna rover system (e.g., 602):

At antenna 1 (e.g., 610) of the rover, we can write the equation $$R1 = [A]x1 - N1,$$

where R1 is a carrier phase observation vector (single or double difference) at antenna 1, A is a design matrix, X1 is the location vector of antenna 1 (may include clock if single differencing is used), and N1 is an ambiguity vector for antenna 1.

Similarly, at antenna 2 (e.g., 612) we can write $$R2 = [A]x2 - N2$$

Where R2 is a carrier phase observation vector at antenna 1, A is a design matrix, X2 is the location vector of antenna 2, and N2 is an ambiguity vector for antenna 2.

Note, that in this example, the design matrix A is taken to be the same in both antenna equations. But, this is true only if both antennas see the same satellites. A more general example would use separate A1 and A2 for the two equations.

Solving an attitude solution (for example, see U.S. Pat. No. 7,388,539), we find the relative antenna displacement V, and the relative ambiguity M where $$V = x2 - x1$$

and $$M = N2 - N1$$

Thus, combining the above equations, we have $$R1 = [A]x1 - N1$$

$$R2 = [A](x1+V) - (N1+M)$$

Rearranging gives $$R1 = [A]x1 - N1$$

$$R2 - [A]V + M = [A]x1 - N1$$

And, combining into a single vector equations gives $$R = [A]x1 - N$$

Where $$R = [R1, R2 - [A]V + M]^T \text{ and } N = [N1, N1]^T$$

Where 'T' denotes transpose

Referring to the above example, twice as many equations are obtained for the same number of unknowns (e.g. X1 and N1). Solving for the global integer ambiguity N1 is facilitated by the multiple available equations.

Multiple antennas can also be utilized at the base and would provide the advantage of canceling multipath signals. However, multiple antennas on the rover are generally preferred because they provide attitude for the rover 10, which is generally not of concern for the base 636.

IV. Moving Baseline Vehicle/Implement Guidance Systems

Alternative embodiment multiple-antenna GNSS guidance systems are shown in FIGS. 13-18 and utilize a moving baseline between a vehicle-mounted antenna(s) and an implement-mounted antenna. Independent implement steering can be accomplished with a powered, implement steering system or hitch, such as those shown in U.S. Pat. No. 6,865,465, No. 7,162,348 and No. 7,373,231, which are assigned to a common assignee herewith and are incorporated herein by reference.

Figure 13:
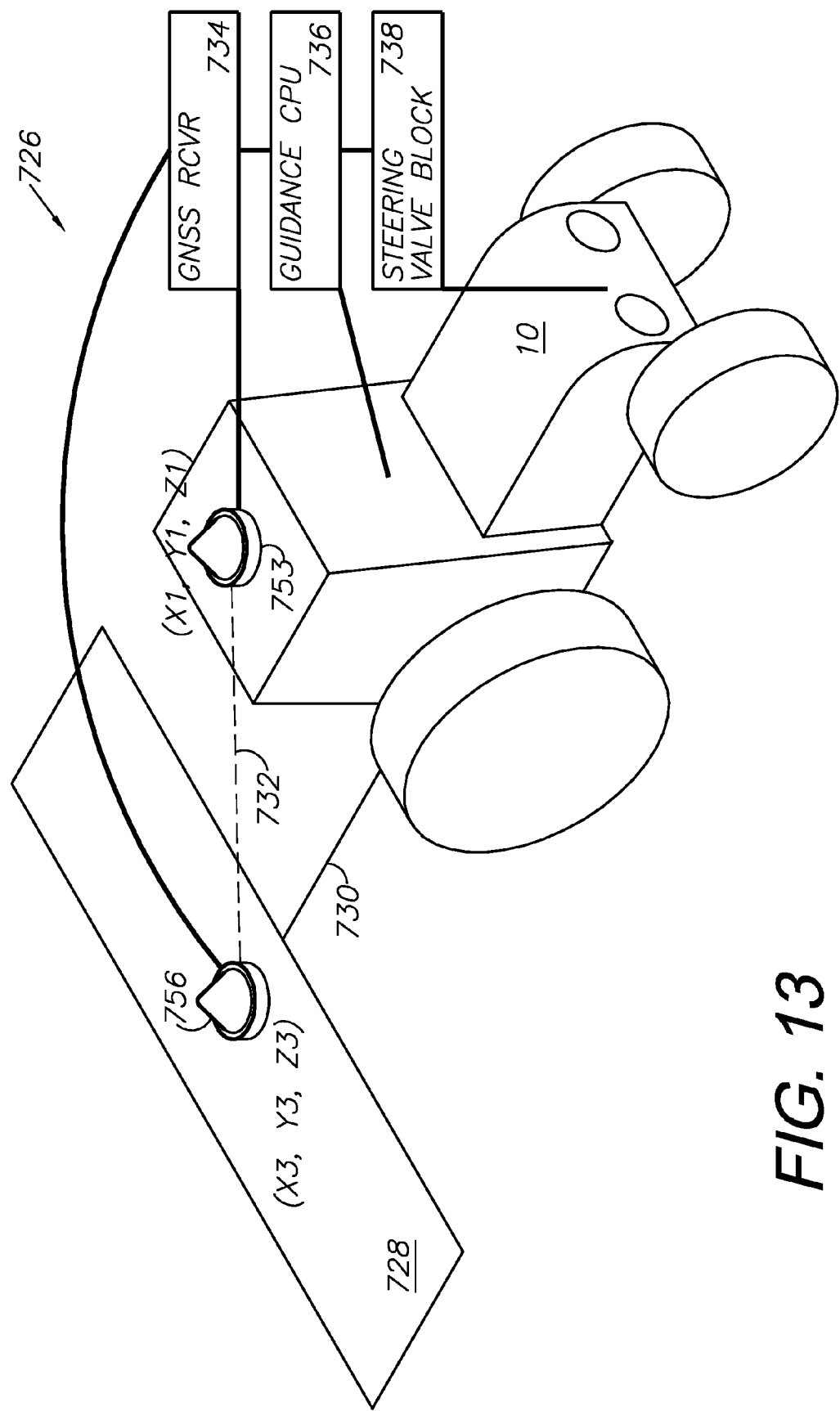
FIG. 13 depicts an alternative aspect of the present invention comprising a moving baseline GNSS system with the tractor and the implement each mounting a respective antenna for a 1+1 antenna configuration.
Figure 14:
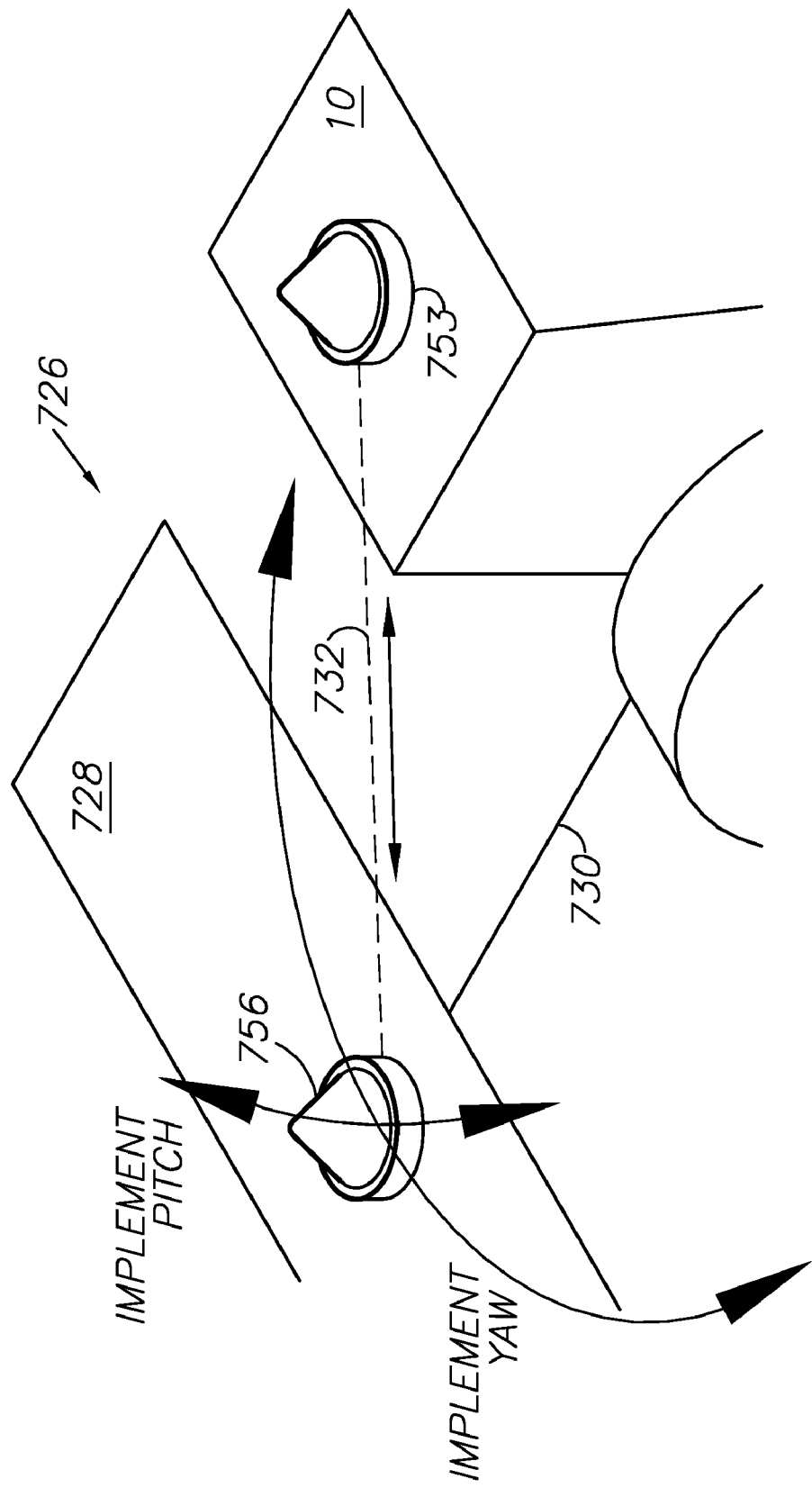
FIG. 14 depicts an enlarged, fragmentary view thereof, particularly showing implement yaw and pitch movements in connection with the moving antenna-to-antenna baseline.

FIGS. 13-14 show a GNSS guidance system 726 comprising another modified embodiment of the present invention and including a vehicle 10 connected to an implement 728 by a hitch 730. The hitch 730 permits the implement 728 to move through three axes of movement relative to the vehicle 10 as the system 726 maneuvers and traverses ground with irregularities causing the vehicle 10 and the implement 728 to yaw, pitch and roll somewhat independently of each other. A moving baseline 732 is defined between points on each, e.g., between a vehicle antenna 753 and an implement antenna 756. The moving baseline 732 is generally a 3D vector with variable length and direction, which can be derived from the differences between the vehicle antenna 753 location (X1, Y1, Z1) and the implement antenna location (X3, Y3, Z3), or other predetermined point locations on the vehicle 10 and the implement 728. The guidance system 726 includes a single GNSS receiver 734 (e.g., a single printed circuit board (PCB) receiver) receiving ranging data streams from the antennas 753, 756, which can include the normal front end RF downconverter components. Using the geodetic-defined position solutions for the antennas 753, 756, the moving baseline 732 is defined and used by a guidance CPU 736 in real-time for computing guidance solutions, which include steering command outputs to the steering valve block 738. The varying separation of the antennas 753, 756 occurs both at the start of attitude acquisition and during operation.

Figure 15:
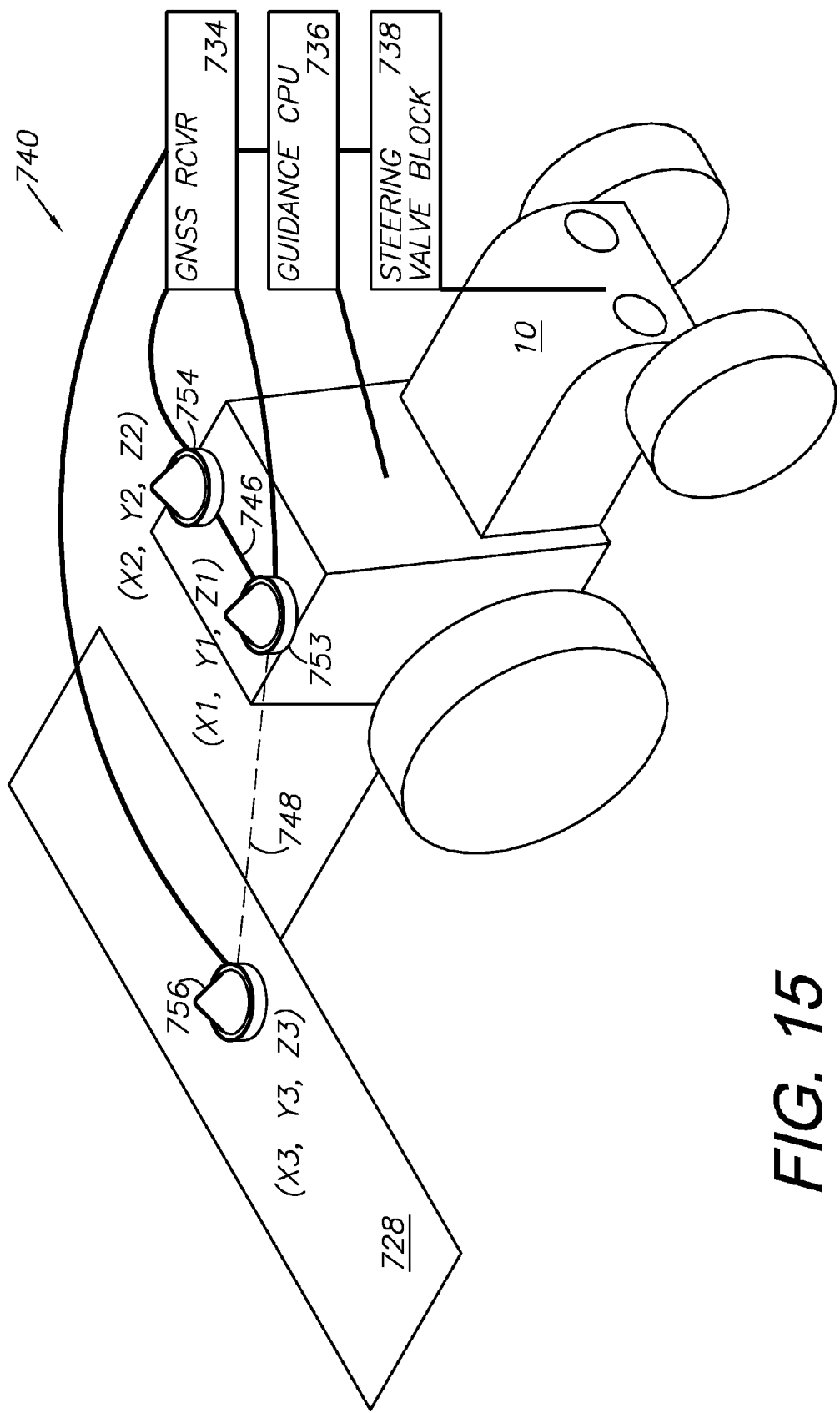
FIG. 15 depicts another moving baseline alternative aspect in a 2+1 antenna configuration.

FIG. 15 shows another alternative aspect vehicle/implement GNSS guidance system 740 with first and second vehicle antennas 753, 754, which can include front end down converter RF components providing ranging signal outputs, along with the implement antenna 756, to the single GNSS receiver 734 as described above. The vehicle antennas 753, 754 define a fixed baseline 754 by their respective positions (X1, Y1, Z1), (X2, Y2, Z2), which function to provide vector heading and rate-of-turn (ROT) output information. Such positioning data is input to the guidance CPU 736 by measuring yaw and roll attitudes whereby such guidance and performance information can be determined solely on GNSS-defined ranging data utilizing the fixed-relationship mounting of the vehicle antennas 753, 754 on the vehicle 10. Such information can be processed in connection with the implement antenna 756 position information in order to provide more complete GNSS positioning and guidance solutions, including travel paths for the vehicle 10 and the implement 728.

Figure 16:
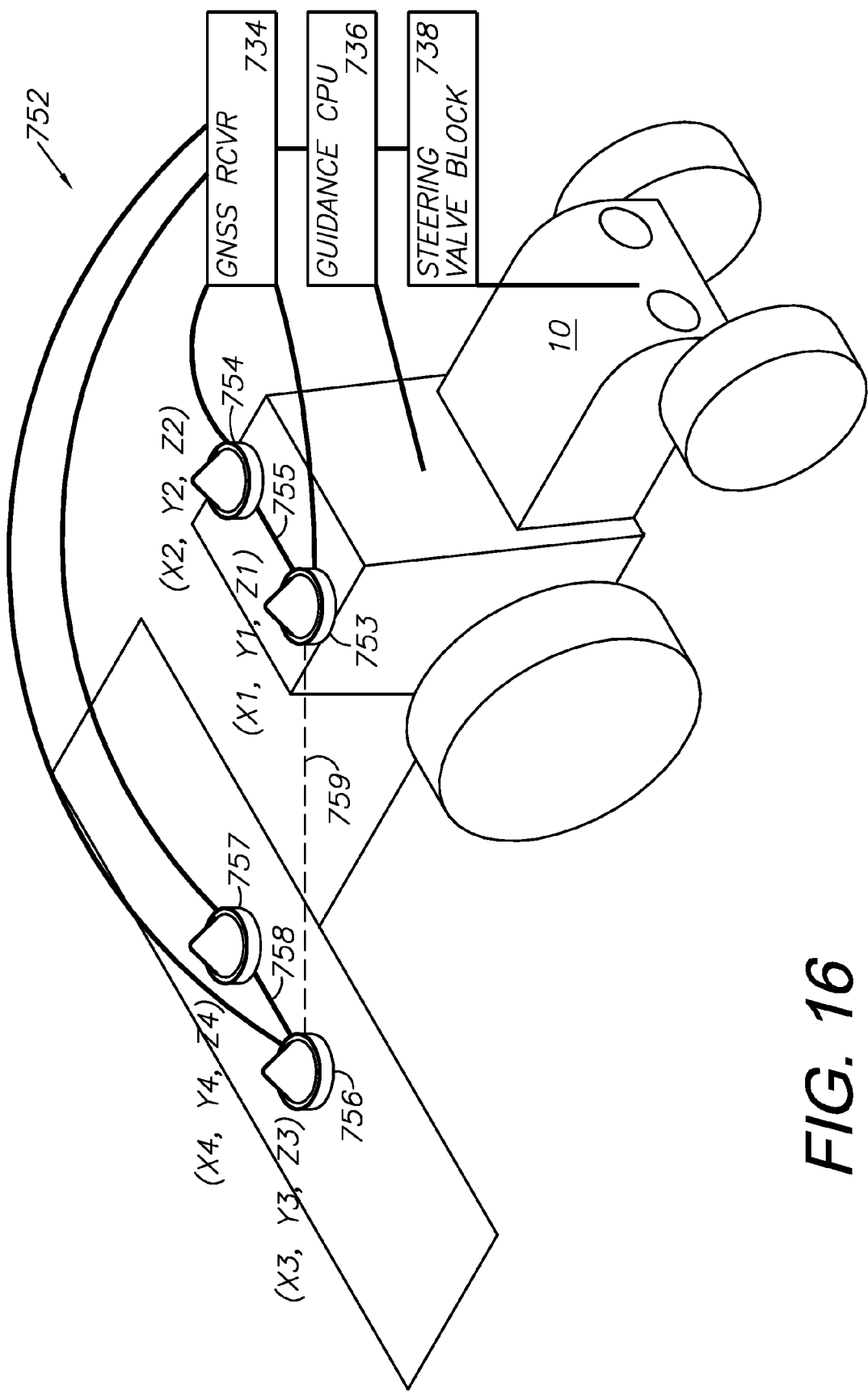
FIG. 16 depicts another moving baseline alternative aspect in a 2+2 antenna configuration.

FIG. 16 shows another modified aspect GNSS positioning system 752, which includes first and second vehicle antennas 753, 754 at GNSS-defined positions (X1, Y1, Z1), (X2, Y2, Z2) respectively, which positions define a vehicle fixed baseline 755. The implement 728 includes first and second implement antennas 756, 757 at GNSS-defined positions (X3, Y3, Z3), (X4, Y4, Z4) respectively, which define an implement fixed baseline 758 and from which the guidance CPU 736 determines heading and ROT for the implement 728 using similar vector techniques to those described above. A movable baseline 759 can be defined between a vehicle antenna 753 and an implement antenna 756 as shown, or between other corresponding antenna pairs, or other predetermined locations on the vehicle 10 and the implement 728. The system 752 utilizes a single GNSS receiver 734 receiving input ranging information from the four antennas 753, 754, 756, 757 and providing a single output stream to the guidance CPU 736. It will be appreciated that various other antenna/receiver combinations can be utilized. For example, a third vehicle and/or implement antenna can be provided for 3-axis attitude computation. INS components, such as gyroscopes and/or accelerometers, can also be utilized for additional guidance correction, although the systems described above can provide highly accurate guidance without such INS components, which have certain disadvantages.

Figure 17:
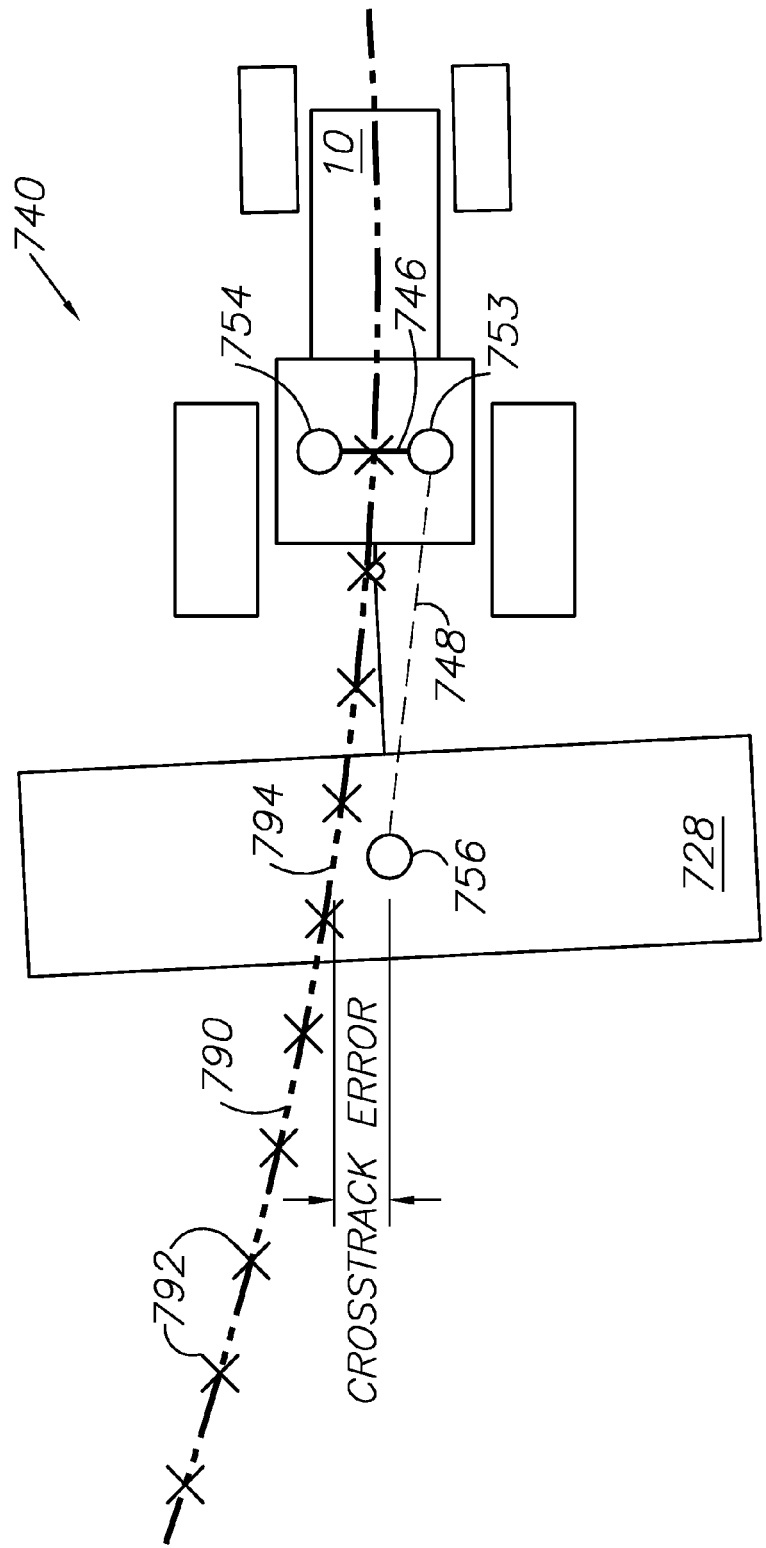
FIG. 17 depicts the 2+1 moving baseline system in a contour mode of operation with a multi-position tail.

FIG. 17 shows the 2+1 antenna system 740 operating in a guidance mode whereby a predetermined number of positions 790 at predetermined intervals are retained by the guidance CPU 736, thereby defining a multi-position "breadcrumb" tail 792 defining the most recent guidepath segment traversed by the vehicle 10 based on the locations of the vehicle antenna(s) 753 (754). Although the 2+1 antenna guidance system 740 is used as an example, the 1+1 antenna guidance system 726 and the 2+2 guidance system 752 can also be used in this mode and function in a similar manner, with more or less ranging signal sources. The guidance CPU 736 utilizes the retained tail "breadcrumb" positions 790 in conjunction with the GNSS-derived antenna locations for computing a crosstrack error representing implement 728 deviation from a desired guidepath 794, and the necessary steering signals for correcting the vehicle 10 course to maintain the implement 728 on track. Still further, in a multiposition tail 792 operating mode the high dynamic roll compensation function described above can be utilized to compensate for vehicle and/or implement roll using the fixed baseline(s) 746, 755, 758 for further guidance solution accuracy based solely on GNSS ranging information.

With the systems 726, 740 and 752, a single receiver can be used for achieving carrier phase relative accuracy, even without differential correction. A single clock associated with the receiver facilitates ambiguity resolution, as compared to dual receiver and dual clock systems. Direct connections among the components further enhance accuracy and facilitate high dynamic roll corrections, as described above. Continuous base and rover ranging data are available for positioning and control. With the 2+1 and the 2+2 configurations, the fixed baseline(s) provide heading and ROT guidance for the vehicle and/or the implement. Steering control for the vehicle is derived from crosstrack error computations utilizing the multiposition tail 792.

Figure 18:
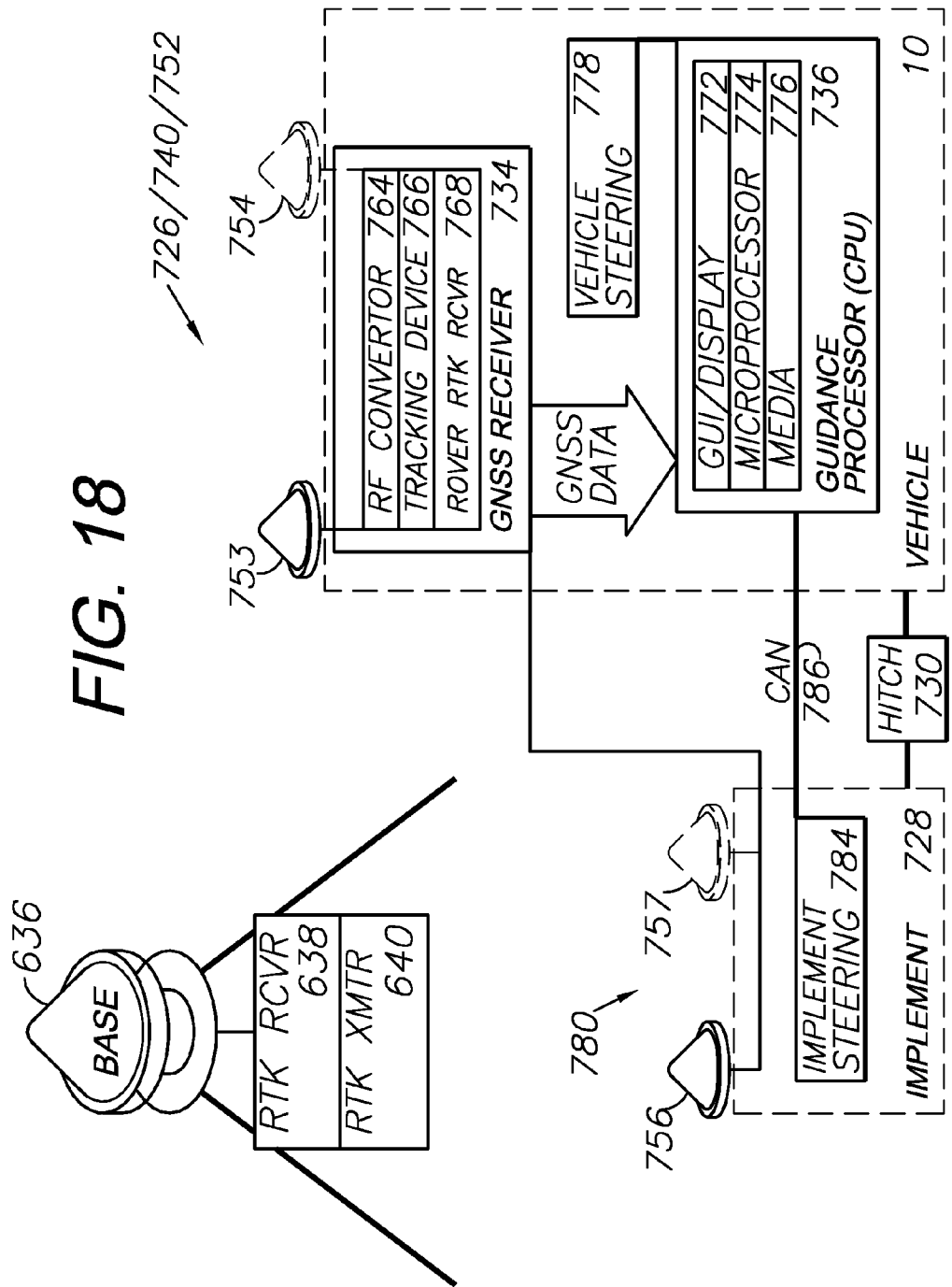
FIG. 18 depicts a block diagram of the moving baseline system(s)

FIG. 18 is a schematic block diagram showing the components of the GNSS guidance systems 726, 740 and 752. The vehicle 10 components include a GNSS receiver 734 including a first vehicle antenna 753, an optional second vehicle antenna 754, an RF down converter 764, a tracking device 766 and an optional rover RTK receiver 768. A guidance processor CPU 736 includes a GUI display 772, a microprocessor 774 and a media storage device 776. Vehicle steering 778 is connected to the guidance processor CPU 736 and receives steering commands therefrom. GNSS-derived data is transferred from the GNSS receiver 734 to the guidance processor CPU 736. The implement 728 mounts an implement positioning system 780 including a first implement antenna 756 and an optional second implement antenna 757, which are connected to the vehicle GNSS receiver 734 and provide GNSS data thereto. An implement steering subsystem 784 receives steering commands from the guidance processor CPU 736 via a CAN bus 786. The implement 728 is mechanically connected to the vehicle 10 by a hitch 788, which can be power-driven for active implement positioning in response to implement steering commands, or a conventional mechanical linkage. The hitch 788 can be provided with sensors for determining relative attitudes and orientations between the vehicle 10 and the implement 728.

V. Multi-Vehicle GNSS Tracking Method

Figure 19:
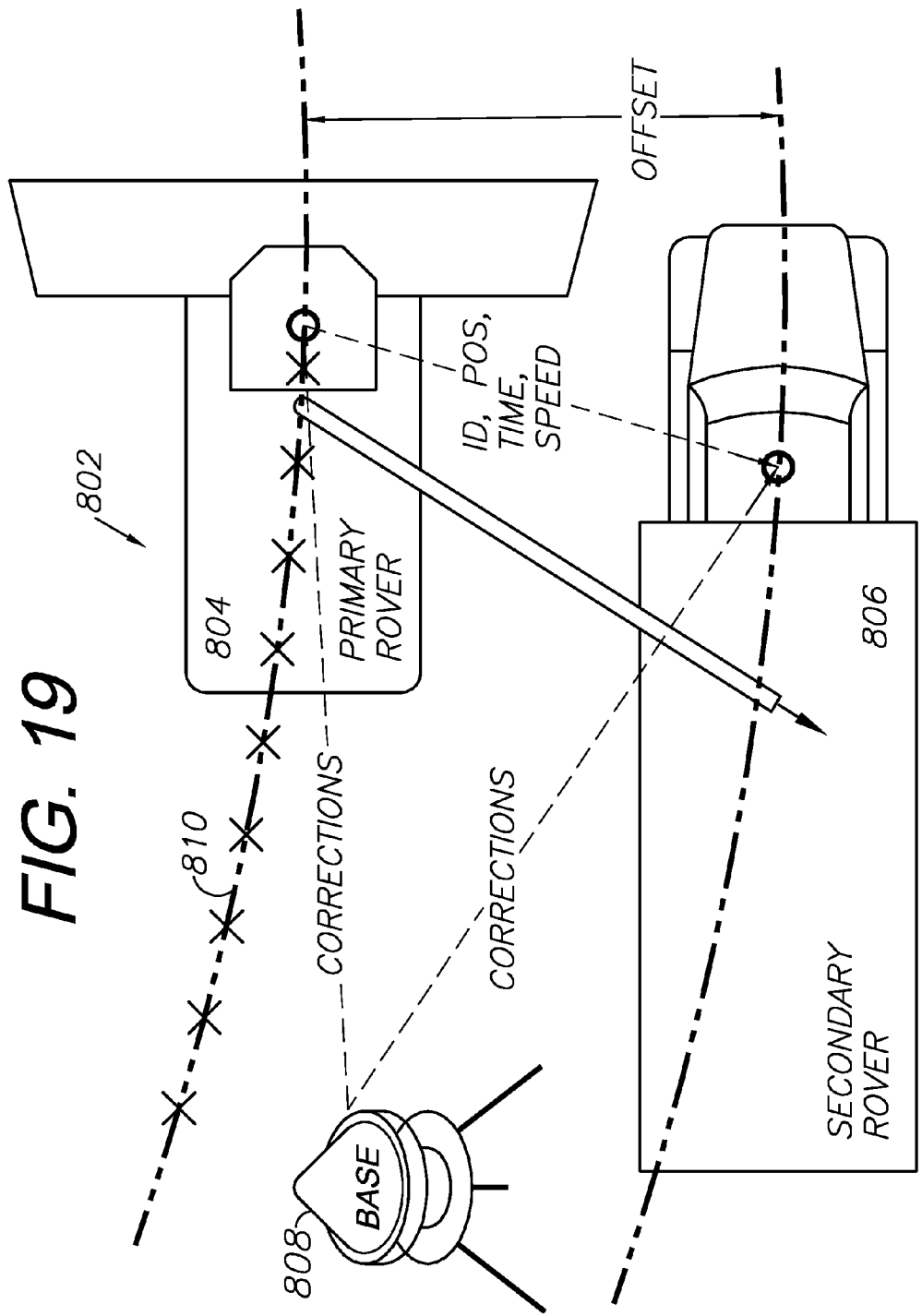
FIG. 19 depicts a multi-vehicle GNSS relative guidance system including primary and secondary rovers.

FIG. 19 shows a multi-vehicle GNSS tracking system 802 adapted for tracking primary and secondary rover vehicles 804, 806, which can comprise, for example, a combine and an offloading truck. Other exemplary multi-vehicle combinations include crop picking and harvesting equipment, snowplows, aircraft engaged in mid-air refueling, etc. Data transfer among the vehicles 804, 806 and a base transceiver 808 can be accomplished with short-range radio links, such as Bluetooth and Wi-Fi wireless technologies. For example, the base transceiver 808 can transmit corrections to the rovers 804, 806 at predetermined intervals of one second (i.e., 1 Hz).

Between the base transmissions the primary rover 804 can transmit its identifying information (ID) and GNSS-derived position and timing information to the secondary rover 806. The secondary rover 806 thus receives both differential corrections and the primary rover data over the same radio link, or through an additional radio link. Such data can comprise a multi-position tail 810 as described above and against which the secondary rover 806 can guide. For example, the secondary rover 806 can directly follow the primary rover 804 at a predetermined distance by aligning its travel path with the multi-position tail 810 at a predetermined following distance, or it can offset its own parallel travel path a predetermined offset distance, as shown in FIG. 19. The secondary rover 806 can position itself relative to the primary rover 804 based on either a predetermined time interval or a predetermined separation distance. As discussed above, the multi-position tail 810 can automatically update whereby only a predetermined number of detected positions are stored, which can correspond to a predetermined time duration or distance behind the primary rover 804.

FIG. 20 shows a schematic block diagram of components comprising the multi-vehicle tracking system 802. The onboard systems for the primary rover 804 and the secondary rover 806 can be similar to the vehicle-based GNSS guidance systems described above, with the addition of an inter-rover radio link 812.

While the description has been made with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof. Therefore, it is intended that the claims not be limited to the particular embodiments disclosed as the currently preferred best modes contemplated for carrying out the teachings herein, but that the claims shall cover all embodiments falling within the true scope and spirit of the disclosure.

Having thus described the invention, what is claimed as new and desired to be secured by Letters Patent is:

1. A GNSS guidance and roll compensation method for autosteering a vehicle with multiple GNSS antennas, a guidance processor including a central processing unit (CPU) and an autosteering subsystem, which method comprises the steps of:

mounting said antennas in a fixed, constrained-geometry relation on said vehicle;

acquiring GNSS ranging signals at said antennas;

computing with said receiver GNSS ranging data using said GNSS ranging signals as input;

computing with said CPU a position and a heading for the vehicle using said GNSS ranging data as input from said receiver;

computing with said CPU vehicle roll data in real time from ranging differences at said GNSS antennas;

computing roll correction values from said vehicle roll data;

applying said roll correction values to steering commands output from said CPU;

steering said vehicle with said autosteering subsystem utilizing said steering command and said roll correction values; and applying a delay phase shift to said roll correction values.

2. The method according to claim 1, which includes the additional steps of: determining an antenna height consisting of a height of said antennas above ground level; and calibrating said correction values based on an antenna height and a residual GNSS positioning error.

3. The method according to claim 2, which includes additional steps of increasing said roll correction values to compensate for residual GNSS positioning error.

4. The method according to claim 2, which includes the additional steps of:

preprogramming said GNSS system with a predetermined, fixed roll correction value; and subtracting from said fixed roll correction values a roll error in real time.

5. A moving baseline GNSS guidance method for an articulated equipment unit comprising a vehicle and an implement connected thereto by an articulated connection, said equipment unit being equipped with a GNSS receiver, a GNSS guidance processor including a central processing unit (CPU) and a steering subsystem, said method comprising the steps of:
- mounting a vehicle GNSS antenna on said vehicle;
- mounting an implement GNSS antenna on said implement;
- receiving GNSS ranging signals with said antennas;
- inputting said GNSS ranging signals to said receiver;
- computing GNSS positioning data corresponding to said antenna positions with said receiver using said GNSS ranging signals;
- inputting said GNSS positioning data from said GNSS receiver to said CPU;
- defining with said CPU a moving baseline between said antennas using the relative GNSS-defined positions of said antennas in real time;
- varying said moving baseline distance and direction in real time corresponding to said vehicle and implement relative movements;
- computing steering commands with said CPU and outputting said steering commands to said autosteer subsystem; and
- steering said vehicle and/or said implement with said steering commands.

6. The method according to claim 5 wherein said vehicle antenna comprises a first vehicle antenna, which method includes the additional steps of:
- providing a second vehicle antenna mounted on said vehicle in fixed relation relative to said first vehicle antenna;
- receiving GNSS ranging signals with said second vehicle antenna;
- inputting said second vehicle antenna GNSS ranging signals to said receiver;
- calculating GNSS positioning data for said second vehicle antenna with said GNSS receiver;
- inputting said second vehicle antenna GNSS positioning data from said GNSS receiver to said CPU;
- computing in real time with said CPU GNSS-defined vehicle attitude, heading and rate-of-turn GNSS data using said GNSS positioning data from said vehicle antennas;
- varying said moving baseline distance and direction in real time corresponding to said vehicle and implement relative movements;
- computing steering commands with said CPU and outputting said steering commands to said autosteer subsystem; and
- guiding said vehicle with said positioning, vehicle attitude, heading and rate-of-turn GNSS-defined data.

7. The method according to claim 6, which includes the additional steps of:
- providing a second implement antenna mounted on said implement in fixed relation relative to said first implement antenna;
- receiving GNSS ranging signals with said second implement antenna;
- inputting said second implement antenna GNSS ranging signals to said receiver;
- calculating GNSS positioning data for said second implement antenna with said GNSS receiver; and
- inputting said second implement antenna GNSS positioning data from said GNSS receiver to said CPU.

8. The method according to claim 7 wherein said implement includes an implement guidance system, which method includes the additional steps of:
- providing an implement guidance system connected to said implement;
- computing with said CPU in real time implement guidance signals; and
- outputting from said CPU to said implement guidance system said implement guidance signals; and
- guiding said implement with said implement guidance system utilizing said implement guidance signals.

9. The method according to claim 5, which includes the additional steps of:
- defining with said GNSS guidance system a multiposition tail comprising multiple GNSS positions trailing said vehicle and a predetermined time or distance spacing;
- saving with said CPU the most recent said GNSS positions along said tail; and
- deleting from said GNSS guidance system older positions.

10. The method according to claim 9, which includes the additional steps of:
- saving in said GNSS guidance system a guide path for said implement;
- computing in real time with said CPU a crosstrack error of said implement relative to said guidepath utilizing said GNSS vehicle and implement positioning data, vehicle heading and vehicle rate-of-turn;
- compensating with said vehicle steering subsystem for said crosstrack error; and
- guiding said implement along said guidepath.

11. A real-time kinematic (RTK) GNSS guidance method for autosteering a vehicle with multiple GNSS antennas, a guidance processor including a central processing unit (CPU) and an autosteering subsystem, which method utilizes carrier-phase GNSS signals from a base station at a predetermined location and comprises the steps of:
- mounting said antennas in a fixed, constrained-geometry relation on said vehicle;
- transmitting code and carrier phase GNSS positioning data from the base station to said vehicle-mounted antennas;
- acquiring GNSS ranging signals at said antennas;
- computing with said receiver GNSS ranging data using said GNSS ranging signals as input;
- computing with said CPU a position and a heading for the vehicle using said GNSS ranging data as input from said receiver;
- determining the relative locations and relative ambiguities of the vehicle-mounted antennas utilizing an attitude solution taking advantage of known constraints in geometry and/or a common clock or synchronized clocks;
- forming single or double difference equations utilizing said GNSS positioning data and solving for the global ambiguities utilizing the relative antenna locations and/or a common clock or synchronized clocks and relative ambiguities; and
- computing in real-time with said CPU steering signals utilizing said GNSS positioning and heading data and said relative locations of said vehicle GNSS receiver's and said relative ambiguities and the known attitude solution; and
- providing as input from said CPU to said steering subsystem said steering signals; and
- steering said vehicle with said steering signals as input from said CPU.

12. The method according to claim 11, which includes the additional steps of:

storing with said GNSS guidance system an attitude solution comprising locations and ambiguities;
time-tag matching the stored attitude solution information with GNSS information from the base station; and
storing off current GNSS carrier phase observations for time-tag matching the stored current GNSS carrier phase observations with GNSS information from the base station.

13. The method according to claim 11, which includes the additional steps of:
providing multiple antennas and said base; and
canceling multipath GNSS signal errors at the base.

14. A GNSS guidance method for primary and secondary rover vehicles each equipped with a GNSS receiver, a GNSS guidance processor including a central processing unit (CPU) and a steering subsystem, said method comprising the steps of:
mounting a vehicle GNSS antenna on each said vehicle;
receiving GNSS ranging signals with said antennas;
inputting said GNSS ranging signals to said receiver;
computing GNSS positioning data corresponding to said antenna positions with said receiver using said GNSS ranging signals;
inputting said GNSS positioning data from said GNSS receiver to said CPU;
transmitting GNSS corrections signals from said base transceiver to said rover vehicle receivers;
transmitting from said primary rover vehicle identification, position, time and speed information to said secondary rover vehicle;
computing steering commands with said CPU and outputting said steering commands to said autosteer subsystem;
steering said vehicle and/or said implement with said steering commands;
transmitting differential corrections from said base transceiver and master rover GNSS data over the same radio link or an additional radio link;
transmitting said differential corrections at predetermined time intervals; and
transmitting said master rover GNSS data between said differential correction transmissions.

15. The method according to claim 14, which includes the additional step of said secondary rover storing said primary rover information corresponding to a multiple position tail consisting of the most recent master rover information transmissions; and
deleting from said secondary rover GNSS system older master rover GNSS data.

* * * * *